(12) United States Patent
Hokazono et al.

(10) Patent No.: US 10,830,186 B2
(45) Date of Patent: Nov. 10, 2020

(54) PREMIXED COMPRESSION IGNITION ENGINE SYSTEM

(71) Applicant: Mazda Motor Corporation, Hiroshima (JP)

(72) Inventors: Tohru Hokazono, Hiroshima (JP); Kota Maekawa, Hiroshima (JP); Yoshihisa Nakamoto, Hiroshima (JP); Masaharu Marumoto, Hiroshima (JP); Yusuke Koike, Hiroshima (JP); Ryohei Ono, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 38 days.

(21) Appl. No.: 16/339,975

(22) PCT Filed: Oct. 5, 2017

(86) PCT No.: PCT/JP2017/036361
§ 371 (c)(1),
(2) Date: Apr. 5, 2019

(87) PCT Pub. No.: WO2018/066665
PCT Pub. Date: Apr. 12, 2018

(65) Prior Publication Data
US 2020/0040850 A1 Feb. 6, 2020

(30) Foreign Application Priority Data
Oct. 7, 2016 (JP) ................................. 2016-199445

(51) Int. Cl.
*F02M 25/022* (2006.01)
*F02B 9/02* (2006.01)
(Continued)

(52) U.S. Cl.
CPC .......... *F02M 25/0227* (2013.01); *F02B 9/02* (2013.01); *F02B 47/02* (2013.01);
(Continued)

(58) Field of Classification Search
CPC .... F02M 25/03; F02M 25/0227; F02B 47/02; F02D 19/12; F02D 41/0025; F02D 41/402; F02D 41/403; Y10T 10/121
(Continued)

(56) References Cited

U.S. PATENT DOCUMENTS

2006/0037563 A1* 2/2006 Raab .................. F02D 41/3035
123/25 C
2012/0260886 A1 10/2012 Mulye
(Continued)

FOREIGN PATENT DOCUMENTS

JP    H03115726 A    5/1991
JP    2004068776 A   3/2004
(Continued)

OTHER PUBLICATIONS

Japanese Patent Office, Amended Claims Submitted in Application No. 2014-505249, May 21, 2015, 11 pages.

*Primary Examiner* — Jacob A Amick
*Assistant Examiner* — Michael A Kessler
(74) *Attorney, Agent, or Firm* — Alleman Hall Creaseman & Tuttle LLP

(57) ABSTRACT

A premixed compression ignition engine system includes an engine, a fuel injector, a water injector, and a controller. The controller conducts: a compression-stroke mid-period injection that causes a fuel injector to inject fuel to form a fuel-air mixture in a surrounding space of a combustion chamber; a compression top-dead-center injection that causes the fuel injector to inject fuel to form a fuel-air mixture in the central space of the combustion chamber after the compression-
(Continued)

stroke mid-period injection; and a water injection that causes a water injector to inject water to the surrounding space of the combustion chamber at a timing from commencement of the compression-stroke mid-period injection to commencement of the compression top-dead-center injection.

7 Claims, 15 Drawing Sheets

(51) Int. Cl.

| | | |
|---|---|---|
| *F02B 47/02* | (2006.01) | |
| *F02D 41/00* | (2006.01) | |
| *F02M 25/03* | (2006.01) | |
| *F02D 41/40* | (2006.01) | |
| *F02D 41/38* | (2006.01) | |
| *F02M 61/14* | (2006.01) | |
| *F02M 61/18* | (2006.01) | |
| *F02F 3/28* | (2006.01) | |

(52) U.S. Cl.
CPC ....... *F02D 41/0025* (2013.01); *F02D 41/403* (2013.01); *F02F 3/28* (2013.01); *F02M 25/03* (2013.01); *F02M 61/14* (2013.01); *F02M 61/1806* (2013.01); *F02D 2041/389* (2013.01); *F02D 2200/022* (2013.01)

(58) Field of Classification Search
USPC ........................................................ 123/25 C
See application file for complete search history.

(56) References Cited

U.S. PATENT DOCUMENTS

| | | | |
|---|---|---|---|
| 2012/0298071 A1* | 11/2012 | Horibe | ............... F02B 23/0651 |
| | | | 123/299 |
| 2015/0128897 A1 | 5/2015 | Mulye | |
| 2016/0076440 A1 | 3/2016 | Mulye | |
| 2016/0245164 A1* | 8/2016 | Nishida | ................... F02B 47/02 |
| 2016/0258388 A1* | 9/2016 | Nishida | ................. F02B 17/005 |
| 2017/0022892 A1* | 1/2017 | Fujimoto | ................. F01N 3/04 |
| 2017/0362997 A1 | 12/2017 | Mulye | |

FOREIGN PATENT DOCUMENTS

| | | | |
|---|---|---|---|
| JP | 2006522262 A | | 9/2006 |
| JP | 2008175078 A | | 7/2008 |
| JP | 2009138661 A | | 6/2009 |
| JP | 2012241590 A | | 12/2012 |
| JP | 2012241592 A | | 12/2012 |
| JP | 2014517185 A | | 7/2014 |
| JP | 2016098797 A | | 5/2016 |
| JP | 2018059489 A | * | 4/2018 |
| JP | 2018059490 A | * | 4/2018 |
| WO | 2011145758 A1 | | 11/2011 |

* cited by examiner

PREMIXED COMPRESSION IGNITION ENGINE SYSTEM

TECHNICAL FIELD

The present disclosure relates to a premixed compression ignition engine system.

BACKGROUND ART

This type of engine system is described in, for example, Patent Document 1. An engine system described in Patent Document 1 has such a configuration that, while the engine operates in a high-load range, injects fuel from a fuel injector at two separate timings; at around the compression top dead center and at a predetermined timing prior to the compression top dead center during the compression stroke. In this configuration, the preceding-stage fuel injection forms a fuel-air mixture in a surrounding portion of the combustion chamber, and the formed fuel-air mixture is ignited by compression and burnt at around the compression top dead center. This combustion elevates the temperature and pressure of the combustion chamber, which allows a fuel-air mixture formed in a central portion of the combustion chamber by the succeeding-stage fuel injection to be more quickly ignited and seamlessly burnt.

Engine systems including a water injector are traditionally known, as described in Patent Document 2. An engine system described in Patent Document 2 has a disc-shaped concave cavity formed in the central portion of the crown top surface of a piston and further has a water injector in the ceiling of a pent-roof combustion chamber in a manner having the axis of injection (the direction of injection) pointing to the inside of the cavity. The water injector directly injects water toward the combustion chamber at around the top dead center and applies water to the surface of the cavity of the piston, whereby a water film is formed on the surface. This water film is capable of keeping combustion heat from being dissipated through the crown top surface of the piston and therefore improving the thermal efficiency.

CITATION LIST

Patent Document

Patent Document 1: Japanese Unexamined Patent Publication No. 2012-241590
Patent Document 1: Japanese Unexamined Patent Publication No. 2008-175078

SUMMARY OF THE INVENTION

Technical Problem

In a premixed compression ignition engine system, a compression-ignition combustion proceeds quite rapidly with an increase in the engine load. The pressure in the cylinder therefore sharply elevates, which unfortunately increases combustion noise. Slow compression-ignition combustion can be one of countermeasures, which, however, makes the combustion less stable. Suppression of combustion noise and stability of combustion are tradeoffs with respect to each other.

To achieve both reduction of combustion noise and stability of combustion, as described in Patent Document 1, such a method is effective that injects fuel to the combustion chamber at separate times and ignites the fuel in the combustion chamber by compression with a certain time lag between the ignitions. Heat in the combustion chamber is dissipated outside through wall surfaces defining the chamber, which are, the crown top surface of the piston, the inner peripheral surface of the cylinder, and the lower surface of the cylinder head. Such heat dissipation can relatively increase the temperature of a central space, of the combustion chamber, corresponding to the inside of the cavity of the piston and relatively decrease the temperature of a surrounding space, of the combustion chamber, corresponding to the outer periphery of the cavity. It is therefore preferable to control the conditions of a fuel-air mixture to first ignite the fuel-air mixture formed in the central space of the combustion chamber by compression, and thereafter ignite the fuel-air mixture formed in the surrounding space of the combustion chamber by compression.

When injecting fuel at separate times, the first fuel injection needs to be done at an early timing in order to avoid generation of smoke due to insufficient mixing of fuel and air and to avoid a reduction in the fuel efficiency. Such early fuel injection, however, increases the duration in which the injected fuel is exposed to a high-temperature environment in the combustion chamber. The fuel-air mixture in the surrounding space of the combustion chamber, which mixture is supposed to be ignited in a delayed manner because of the heat loss through the defining wall surfaces of the combustion chamber, may be subjected to abnormal combustion, and pre-ignition of the mixture is therefore likely to be caused. The mixture in the surrounding space of the combustion chamber thus may be ignited by compression and burnt at a timing close to the timing of the mixture in the central space of the combustion chamber. Such a small time lag between combustion in the central space and combustion in the surrounding space of the combustion chamber may make preferable control to combustion noise less effective.

The present disclosure is conceived in view of the above problems, and attempts to effectively achieve both reduction in combustion noise and more stable combustion by causing a fuel-air mixture, formed in the surrounding space of the combustion chamber, to be ignited by compression in a sufficiently delayed manner.

Solution to the Problem

In order to carry out the above attempt, techniques of the present disclosure employ at least two separate fuel injections to feed fuel to the combustion chamber and conduct a water injection between the preceding-stage and the succeeding-stage fuel injections.

More specifically, the techniques of the present disclosure are directed to a premixed compression ignition engine system that includes an engine with a cylinder, a piston reciprocatably disposed in the cylinder, a fuel injector to inject fuel and a water injector to inject water into a combustion chamber defined by a crown top surface of the piston, the cylinder, and a lower surface of a cylinder head, and a controller to control fuel injection operation of the fuel injector and water injection operation of the water injector.

The engine system has a downward concave cavity formed in a central portion of the crown top surface of the piston. The engine system is designed to form a fuel-air mixture including air and fuel injected into the combustion chamber by the fuel injector and to ignite the fuel-air mixture by a compression operation of the piston in the combustion chamber, specifically, at least in a central space corresponding to the inside of the cavity, of the central space and the surrounding space corresponding to the outer periphery of the cavity.

The controller conducts: a first fuel injection that causes the fuel injector to inject fuel to form a fuel-air mixture in the surrounding space of the combustion chamber; a second fuel injection that causes the fuel injector to inject fuel to form a fuel-air mixture in the central space of the combustion chamber after the first fuel injection; and a water injection that causes the water injector to inject water to the surrounding space of the combustion chamber at a timing from the commencement of the first fuel injection to the commencement of the second fuel injection.

In this configuration, fuel is injected to the surrounding space of the combustion chamber by the first fuel injection. Subsequently, fuel is injected to the central space of the combustion chamber by the second fuel injection. Water is injected to the surrounding space of the combustion chamber by the water injection at a timing from the commencement of the first fuel injection to the commencement of the second fuel injection. This operation can cool the surrounding space of the combustion chamber, to which the fuel is injected at a comparatively early timing, and the fuel-air mixture formed in the surrounding space by the action of latent heat and sensible heat of the water. This process makes the fuel-air mixture formed in the surrounding space of the combustion chamber more difficult to be ignited than the fuel-air mixture formed in the central space of the combustion chamber, which ensures that the mixture in the surrounding space of the combustion chamber is ignited later than ignition of the mixture in the central space of the combustion chamber. This delay preferably allows the combustion to proceed more slowly while ignitability of the fuel-air mixture formed in the combustion chamber is maintained. Consequently, reduction in combustion noise and stable combustion are both achieved.

In the above engine system, the controller may conduct neither first fuel injection nor water injection when the engine is operating in a first operating range that is lower than a predetermined load and may conduct the first fuel injection and the water injection when the engine is operating in a second operating range that is higher than the predetermined load.

In this configuration, the first fuel injection is not conducted when the engine is operating in the first operating range that is lower than the predetermined load. In this range, only the second fuel injection is therefore conducted. This manner allows the fuel-air mixture to be formed only in the central space of the combustion chamber and also allows a gas layer to be formed around the mixture. The formed gas layer serves as an insulating layer during combustion of the fuel-air mixture. This configuration can therefore achieve reduction in cooling loss of the engine.

In the above configuration, no water injection is conducted in the first operating range where no first fuel injection is conducted. A water injection decreases the temperature of the surrounding space of the combustion chamber and decreases the temperature of the fuel-air mixture formed in the space by the action of latent heat and sensible heat of the water. Such temperature drops can make the combustion less stable; however, because no fuel-air mixture is formed in the surrounding space of the combustion chamber unless the first fuel injection is conducted, there is no necessity of having water injection to prevent pre-ignition in the surrounding space. Having no water injection can keep the combustion from being less stable.

In the above configuration, the first fuel injection is conducted when the engine is operating in the second operating range that is higher than a predetermined load. The first fuel injection allows the surrounding space of the combustion chamber to contain a fuel-air mixture therein. Combustion of this fuel-air mixture can generate large power compared to combustion of the fuel-air mixture only in the central space of the combustion chamber.

In the above configuration, the water injection is conducted when the first fuel injection is conducted. An increase in the engine load elevates the temperature of the combustion chamber, which frequently causes abnormal combustion and thus causes pre-ignition of the fuel-air mixture formed by the first fuel injection. The water injection can preferably reduce such pre-ignition.

In the above engine system, the controller may estimate the temperature of the combustion chamber of the time the piston reaches the compression top dead center, conduct the water injection if the estimate temperature is equal to or higher than a predetermined temperature, and conduct no water injection if the estimate temperature is below the predetermined temperature. The predetermined temperature is set at, for example, 1000 K or more.

In this configuration, the water injection is conducted when the temperature of the combustion chamber at the compression top dead center is estimated to be equal to or greater than a predetermined temperature. If the fuel-air mixture formed in the surrounding space of the combustion chamber is comparatively likely to be pre-ignited, this manner of water injection can preferably reduce such pre-ignition.

Moreover, in the above configuration, no water injection is conducted when the temperature of the combustion chamber at the compression top dead center is estimated to be below a predetermined temperature. A water injection decreases the temperature of the combustion chamber and decreases the temperature of the fuel-air mixture formed in the surrounding space of the combustion chamber by the action of latent heat and sensible heat of the water. Such temperature drops can make the combustion less stable. If pre-ignition of the fuel-air mixture formed in the surrounding space of the combustion chamber is comparatively less likely to occur, having no water injection can keep the combustion from being less stable.

In the above engine system, the controller may conduct a water injection when the engine is cold.

In this configuration, the water injection is conducted in a cold start situation of the engine. Such a water injection conducted when the engine is cold decreases the temperature of the combustion chamber, and the decrease in temperature promotes ignition retarding that retards the timing of ignition of a fuel-air mixture. Such retarding allows a smaller portion of heat, generated with the fuel-air mixture burnt in the combustion chamber, to be consumed in the expansion stroke of the piston and a larger portion to remain in the exhaust gas. This manner allows a larger amount of heat to be desirably allocated for the exhaust gas. This manner is therefore beneficial in quick warming-up of the engine and in earlier activation of a catalyst, if the engine includes an exhaust gas purifier.

The above engine system may have the geometrical compression ratio of the engine set from 16 to 35.

In this configuration, the geometrical compression ratio of the engine is set at a comparatively high ratio, from 16 to 35, which can improve the theoretical thermal efficiency and make compression-ignition combustion more stable.

In the above engine system, the fuel injector and the water injector have respective front ends with spray holes disposed in the center portion of the ceiling of the combustion chamber. The spray hole of the fuel injector and the spray hole of the water injector may be inclined to the axial line of the cylinder, such that mist of fuel sprayed from the front end of the fuel injector and mist of water sprayed from the front end of the water injector toward the crown top surface of the piston form a hollow-cone pattern. The controller may cause the water injector to inject water in the late period of the compression stroke, which is equally divided into early, mid-, and late periods, and cause the fuel injector to perform the first fuel injection in the mid-period of the compression stroke, and cause the fuel injector to perform the second fuel injection after the late period of the compression stroke and after the water injection.

Advantages of the Invention

The above engine system can achieve both reduction in combustion noise and more stable combustion by conducting compression ignition of a fuel-air mixture in the surrounding space of the combustion chamber in a sufficiently delayed manner.

DESCRIPTION OF EMBODIMENTS

Examples of embodiments will now be described in detail with reference to the drawings.

Overall Configuration of Engine System

Figure 1:
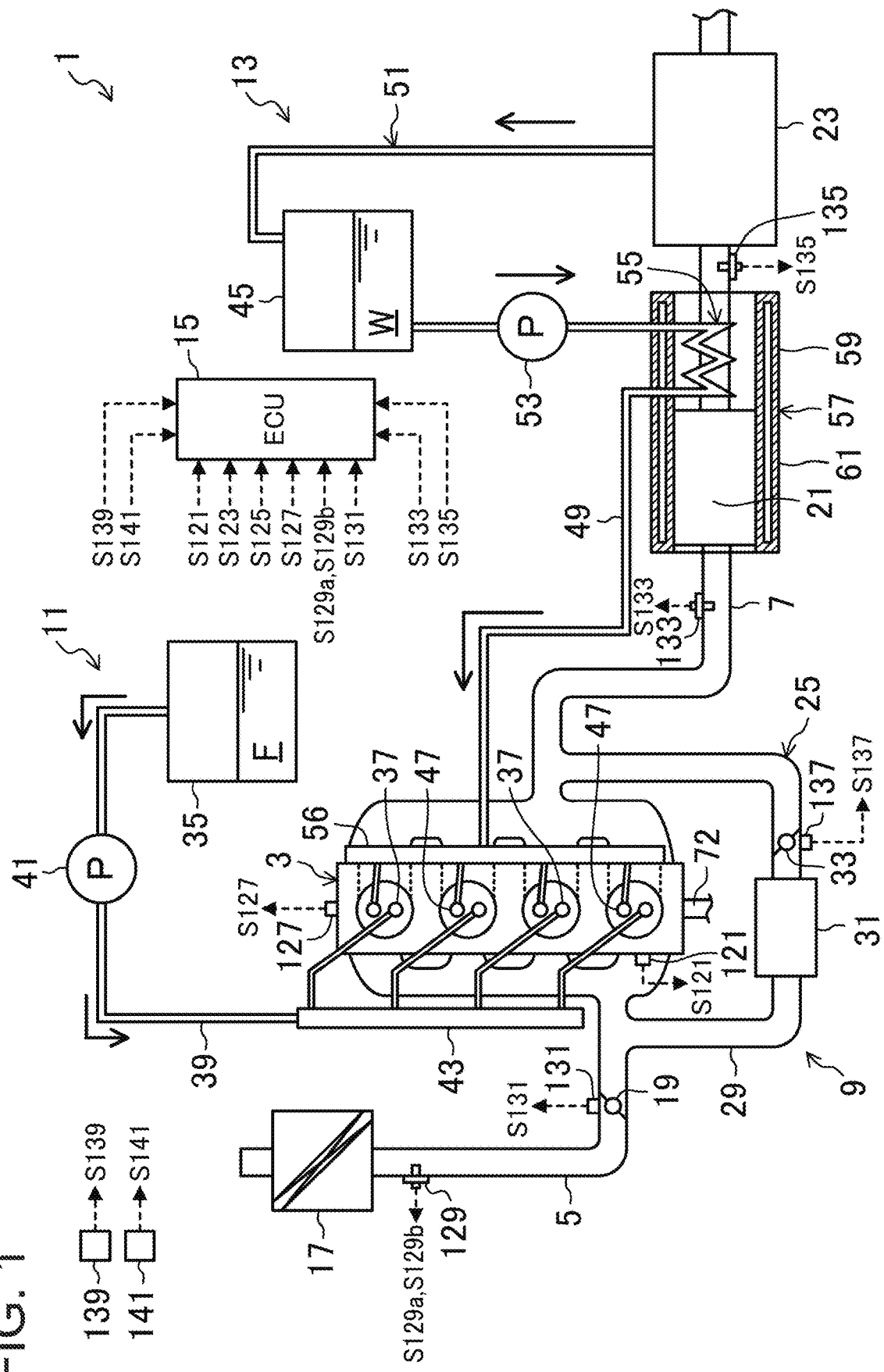
FIG. 1 exemplarily illustrates a configuration of a premixed compression ignition engine system.

FIG. 1 illustrates an example configuration of a premixed compression ignition engine system 1. The premixed compression ignition engine system 1 (hereinafter simply referred to as an "engine system 1") uses gasoline for a fuel F. Gasoline may contain bioethanol and other components. Any liquid fuel, at least containing gasoline, is usable for the fuel F of the engine system 1.

As illustrated in FIG. 1, the engine system 1 includes: an engine 3 where combustion of a mixture of intake air and the fuel F takes place; an intake air passage 5 through which the intake air passes to be introduced to the engine 3; an exhaust gas passage 7 through which exhaust gas, generated by combustion of the fuel-air mixture in the engine 3, is discharged; an exhaust gas recirculation (hereinafter, an "EGR") system 9 configured to reintroduce the exhaust gas (burnt gas) to the engine 3; a fuel feed system 11 configured to feed the fuel F to the engine 3; a water feed system 13 configured to feed water to the engine 3; various sensors configured to detect the operating conditions of the engine 3; and an engine control unit (ECU) 15 serving as a controller configured to integrally control the engine system 1.

Configurations of Intake Air Passage and Exhaust Gas Passage

The intake air passage 5 is provided with, from the upstream, an air cleaner 17 that cleans intake air, and a throttle valve 19 that controls the flow rate of intake air to be fed to the engine 3. The exhaust gas passage 7 is provided with, from the upstream, an exhaust gas purifier 21 that cleans air pollutants contained in exhaust gas, and a condenser 23 that condenses water (water vapor) contained in the exhaust gas. The exhaust gas purifier 21 uses, for example, a catalytic converter with a three-way catalyst.

Configuration of EGR System

The EGR system 9 includes: an external EGR device 25 that performs external EGR to circulate a portion of exhaust gas, once discharged from the engine 3 to the exhaust gas passage 7, through the intake air passage 5; and an internal EGR device 27 (illustrated in later-referred FIG. 2) that performs internal EGR to substantially keep a portion of burnt gas, generated by combustion of a fuel-air mixture in the engine 3, inside the engine 3. The internal EGR device 27 is composed of a sequential valve timing system (S-VT) of an intake valve train 101 and a sequential valve timing system (S-VT) of an exhaust valve train 103, which will be later described.

The external EGR device 25 includes: an EGR bypass 29 that connects between a portion, of the intake air passage 5, located downstream of a throttle valve 19 and a portion, of the exhaust gas passage 7, located upstream of the exhaust gas purifier 21; an EGR cooler 31 that cools exhaust gas circulating through the EGR bypass 29; and an EGR valve 33 that regulates the flow rate of the exhaust gas circulating through the EGR bypass 29. The EGR valve 33 and the EGR cooler 31 are disposed on the EGR bypass 29 in this order from the exhaust gas passage 7 toward the intake air passage 5.

Configuration of Fuel Feed System

The fuel feed system 11 includes: a fuel tank 35 that stores the fuel F; fuel injectors 37 that inject the fuel F in the engine 3; and a fuel passage 39 to feed the fuel F in the fuel tank 35 to the fuel injectors 37. The fuel tank 35 includes a fuel pump (not illustrated) that pumps the fuel F to the fuel passage 39. The fuel passage 39 is provided with, from the upstream, a high-pressure fuel pump 41 that elevates the pressure of the fuel F circulating through the fuel passage 39, and a fuel common rail 43 that transiently stores the fuel F, circulating through the fuel passage 39, before the fuel injectors 37 inject the fuel F.

Configuration of Water Feed System

The water feed system 13 includes: a water tank 45 that stores water W; water injectors 47 that inject the water W in the engine 3; a water passage 49 through which the water W in the water tank 45 is fed to the water injectors 47; and a water recovery system 51 that recovers the water W injected from the water injectors 47 using the exhaust gas passage 7. The water tank 45 includes a water pump (not illustrated) that pumps the water W to the water passage 49. The water passage 49 includes, from the upstream, a high-pressure water pump 53 that elevates the pressure of the water W circulating through the water passage 49, a heat exchanger 55 that transfers heat between the water W circulating through the water passage 49 and exhaust gas circulating through the exhaust gas passage 7, and a water common rail 56 that transiently stores the water W, circulating through the water passage 49, before the water injectors 47 inject the water W.

A heat exchanger 55 is prepared by using a part of the water passage 49 disposed inside the exhaust gas passage 7. The heat exchanger 55 is disposed, in the exhaust gas passage 7, immediately next to the exhaust gas purifier 21 on the downstream side thereof and is accommodated in a heat storage case 57 together with the exhaust gas purifier 21. The heat storage case 57 has a double outer peripheral wall 61 where a heat storage material 59 is filled and keeps the exhaust gas purifier 21 and the heat exchanger 55 warm by accumulating thermal energy of the exhaust gas in the heat storage material 59. The heat storage case 57 keeping the devices warm allows the exhaust gas purifier 21 to be maintained at suitable temperatures and allows the heat exchanger 55 to effectively increase the temperature of the water W in the water passage 49.

Configuration of Engine

Figure 2:
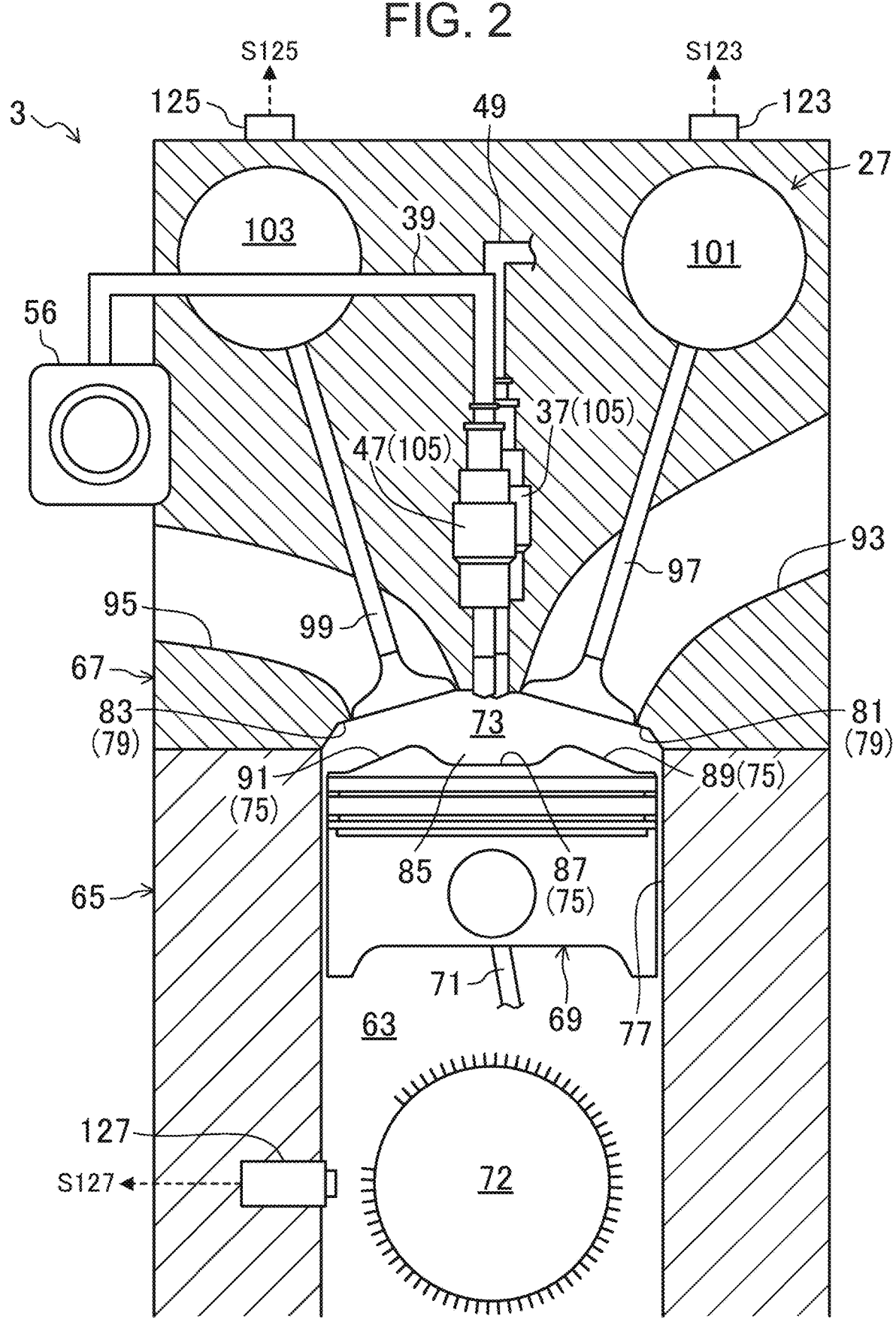
FIG. 2 is a cross-sectional view of an example configuration of an engine.
Figure 3:
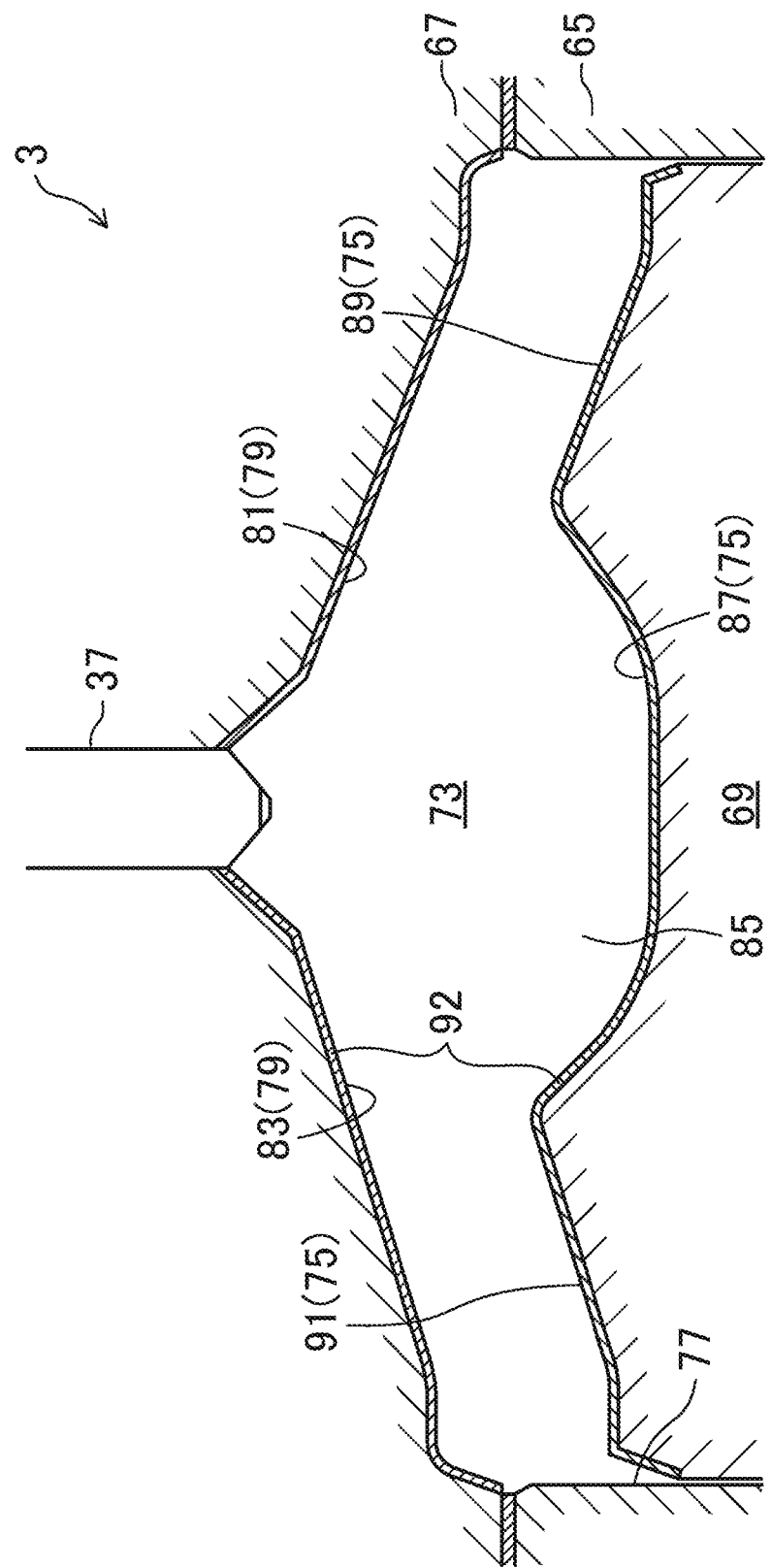
FIG. 3 is a cross-sectional view of an example configuration of a combustion chamber of the engine.

FIG. 2 illustrates an example configuration of the engine 3. FIG. 3 illustrates an example configuration of a combustion chamber 73 in the engine 3.

The engine 3 is a four-stroke, multi-cylinder, reciprocating engine where intake, compression, combustion, and exhaust strokes take place. As illustrated in FIG. 1 and FIG. 2, the engine 3 includes a cylinder block 65 having in-line four cylinders 63 (one of the cylinders is illustrated in FIG. 2) and a cylinder head 67 placed on the cylinder block 65. The cylinder block 65 and the cylinder head 67 include, inside thereof, a water jacket (not illustrated) where engine coolant flows. Each cylinder 63 of the cylinder block 65 has a piston 69 reciprocatably (vertically movably) fit inside thereof.

The piston 69 is connected to a crankshaft 72 through a connecting rod 71. As illustrated in FIGS. 2 and 3, the combustion chamber 73 where a fuel-air mixture is burnt is formed above the piston 69. The combustion chamber 73 is defined by a crown top surface 75 of the piston 69, an inner peripheral surface (a wall surface of a cylinder liner) 77 of the cylinder 63, and a lower surface 79 of the cylinder head 67. The "combustion chamber" herein referred to is not narrowly defined as a space formed when the piston 69 reaches the compression top dead center but is broadly defined as a space surrounded by the piston 69, the cylinder 63, and the cylinder head 67.

The combustion chamber 73 is what is called a pent-roof combustion chamber, as illustrated in FIG. 3. The lower surface 79 of the cylinder head 67 constituting the ceiling of the combustion chamber 73 includes an intake-side ceiling surface 81 situated closer to the intake air passage 5 and an exhaust-side ceiling surface 83 situated closer to the exhaust gas passage 7. The intake-side ceiling surface 81 and the exhaust-side ceiling surface 83 are upwardly inclined toward the center of the cylinder 63 in a direction perpendicular to the direction in which the cylinders 63 are aligned, and form a triangle roof by being connected with each other with a valley portion, extended in the axial direction of the crankshaft 72, disposed therebetween. The valley portion of the pent-roof can or cannot be aligned to the center of the bore of the cylinder 63.

The piston 69 has a downward concave cavity 85 in the center portion of the crown top surface 75. A space, of the combustion chamber 73, corresponding to the inside of the cavity 85 may be referred to as a "central space". Another space, of the combustion chamber 73, corresponding to the outer periphery of the cavity 85 may be referred to as a "surrounding space".

The crown top surface 75 of the piston 69 has an interior surface 87 of the cavity 85, an intake-side inclined surface 89 situated close to the intake side relative to the cavity 85, and an exhaust-side inclined surface 91 situated close to the exhaust side relative to the cavity 85. The intake-side inclined surface 89 is upwardly inclined toward the cavity 85 in a manner corresponding to the intake-side ceiling surface 81. Likewise, the exhaust-side inclined surface 91 is upwardly inclined toward the cavity 85 in a manner corresponding to the exhaust-side ceiling surface 83.

Upper and lower defining wall surfaces defining the combustion chamber 73, that are, the crown top surface 75 of the piston 69 and the lower surface 79 of the cylinder head 67, each have heat shielding layers 92. The heat shielding layers 92 may be provided for the whole surfaces of the defining wall surfaces 75 and 79 or may be provided for some portions of the defining wall surfaces 75 and 79. The heat shielding layer 92 has lower thermal conductivity than that of a metal base material used for the combustion chamber 73. For example, the base material of the piston 69 is aluminum or aluminum alloy.

The heat shielding layer 92 keeps heat of combustion gas in the combustion chamber 73 from being dissipated through the defining wall surfaces 75 and 79 of the combustion chamber 73. It is preferable that the heat shielding layer 92 have a heat capacity smaller than that of the base material. In other words, it is preferable that the heat shielding layer 92 have a reduced heat capacity so that the temperatures of the defining wall surfaces 75 and 79 of the combustion chamber 73 vary with a change in the temperature of gas in the combustion chamber 73. This structure reduces the difference in temperature between the combustion gas and the defining wall surfaces 75 and 79, which can keep the heat from being transferred to the base material through the defining wall surfaces 75 and 79.

The heat shielding layer 92 is made by applying a heat shielding material containing hollow particles (such as glass balloons) and silicone resin used as a binder to the defining wall surfaces 75 and 79 and curing the resin by heating. The heat shielding layer 92 may be prepared by coating the defining wall surfaces 75 and 79 with ceramic materials such as $ZrO_2$ by plasma spraying.

The engine 3 is designed to have a comparatively high geometrical compression ratio, with the intention to improve the theoretical thermal efficiency and stabilize compression-ignition combustion. Specifically, the geometrical compression ratio of the engine 3 may be set from 16 to 40, preferably, from 16 to 25. The expansion ratio is increased with an increase in the compression ratio, which means that the engine 3 has a high compression ratio and a comparatively high expansion ratio.

As illustrated in FIG. 2, the cylinder head 67 has two intake ports 93 open in the intake-side ceiling surface 81 and two exhaust ports 95 open in the exhaust-side ceiling surface 83 for each cylinder 63. The intake port 93 has an opening, located opposite to the combustion chamber 73, connected to the intake air passage 5 such that the combustion chamber 73 and the intake air passage 5 communicate with each other. The exhaust port 95 has an opening, located opposite to the combustion chamber 73, connected to the exhaust gas passage 7 such that the combustion chamber 73 and the exhaust gas passage 7 communicate with each other.

The intake port 93 includes an intake valve 97 to open and close the opening in the intake-side ceiling surface 81 to the combustion chamber 73. The exhaust port 95 includes an exhaust valve 99 to open and close the opening in the exhaust-side ceiling surface 83, to the combustion chamber 73. The intake valve 97 and the exhaust valve 99 are poppet valves having umbrella-like or mushroom-like valve bodies. The cylinder head 67 further includes therein the intake valve train 101 to reciprocate the intake valve 97 at a predetermined timing and the exhaust valve train 103 to reciprocate the exhaust valve 99 at a predetermined timing.

The intake valve train 101 includes, although not illustrated, an intake camshaft connected to the intake valve 97 and a hydraulic or electric sequential-valve timing (S-VT) capable of sequentially varying the phase of rotation of the intake camshaft within a predetermined range of angle. The intake camshaft is connected to the crankshaft 72 through a power transmission system, including, for example, a transmission belt, and drives the intake valve 97 by being rotated by power transmitted from the crankshaft 72.

The exhaust valve train 103 includes, although not illustrated, an exhaust camshaft connected to the exhaust valve 99 and a hydraulic or electric S-VT capable of sequentially varying the phase of rotation of the exhaust camshaft within a predetermined range of angle. The exhaust camshaft is connected to the crankshaft 72 through a power transmission system shared by the intake camshaft, and drives the exhaust valve 99 by being rotated by power transmitted from the crankshaft 72.

The S-VT of the intake valve train 101 and the S-VT of the exhaust valve train 103 conduct internal EGR to draw back burnt gas, once expelled by the exhaust stroke, to the combustion chamber 73, by controlling the timing to open and close the intake valve 97 and timing to open and close the exhaust valve 99, specifically, by opening the exhaust valve 99 during the intake stroke and opening the intake valve 97 during the exhaust stroke. The internal EGR may be conducted by setting a negative overlap that closes both the intake valve 97 and the exhaust valve 99 during the exhaust stroke or the intake stroke and causing the burnt gas to remain in the combustion chamber 73.

The cylinder head 67 is further provided with a fuel injector 37 and a water injector 47. The fuel injector 37 and the water injector 47 are juxtaposed in the direction in which the cylinders 63 are aligned, on the valley portion between the intake-side ceiling surface 81 and the exhaust-side ceiling surface 83. The axial core for injection of the fuel injector 37 and the axial core for injection of the water injector 47 are situated at the center in the direction perpendicular to the direction in which the cylinders 63 are aligned, while deviated from the axial line (the center line) of the cylinder 63 in the direction in which the cylinders 63 are aligned. In another configuration, the axial core for injection of the water injector 47 may be deviated from the axial line of the cylinder 63, or the axial core for injection of the fuel injector 37 may be consistent with the axial line of the cylinder 63. The axial core for injection of the fuel injector 37 may be deviated from the axial line of the cylinder 63, or the axial core for injection of the water injector 47 may be consistent with the axial line of the cylinder 63.

Configurations of Fuel Injector and Water Injector

Figure 4:
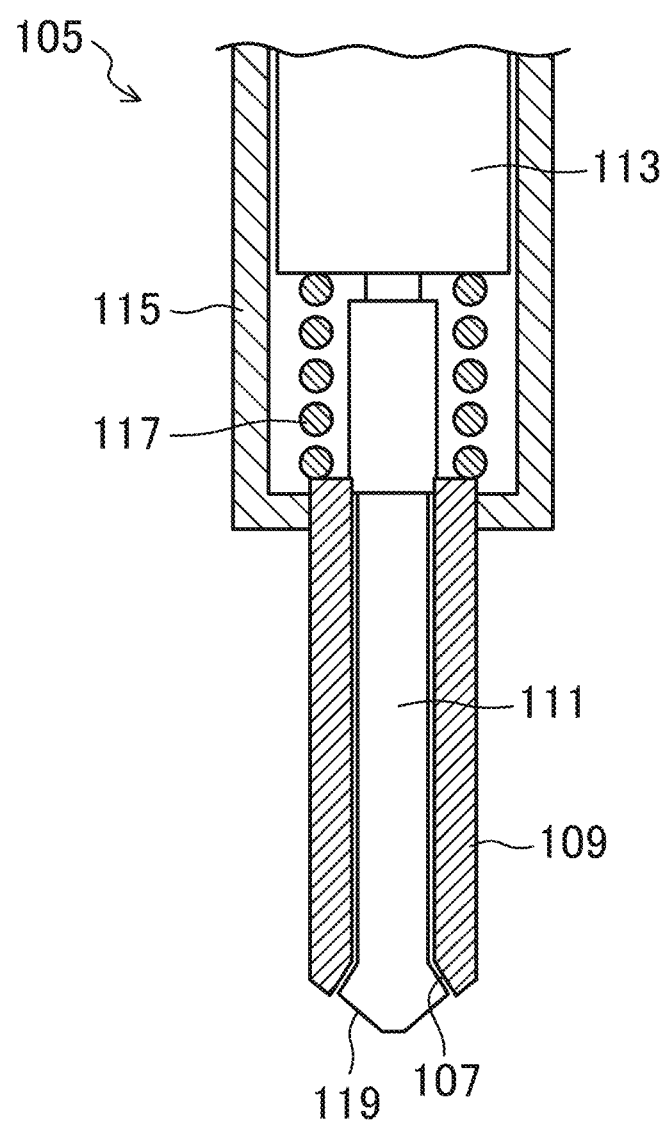
FIG. 4 is a cross-sectional view of an example configuration of an outward opening injector.

The fuel injector 37 and the water injector 47 are injectors 105 that open outward (hereinafter referred to as an "outward opening injector"). The configuration of the outward opening injector 105 used for the fuel injector 37 and the water injector 47 will now be described with reference to FIG. 4. FIG. 4 is a cross-sectional view of an example configuration of the outward opening injector 105. As illustrated in FIG. 4, the outward opening injector 105 includes a nozzle unit 109 having a spray hole 107 and an outward opening injector body 111 that opens and closes the spray hole 107.

The nozzle unit 109 is tubular to circulate the fuel F and has the spray hole 107 at the front end thereof. The spray hole 107 is tapered with the diameter increased toward the front end. The outward opening injector body 111 is disposed in the nozzle unit 109. The nozzle unit 109 has its base end connected to a case 115 accommodating a drive mechanism to eject and retract the outward opening injector body 111. The case 115 accommodates the above drive mechanism that includes a piezoelectric device 113 and a compression coil spring 117 to press the piezoelectric device 113 in a direction remote from the nozzle unit 109. The outward opening injector body 111 has its base end connected to the piezoelectric device 113. The outward opening injector body 111 has its front end facing outside from the inside of the spray hole 107 and is formed in the shape of a block having an abutment surface 119 facing the tapered surface of the spray hole 107 of the nozzle unit 109.

The piezoelectric device 113 presses the outward opening injector body 111 toward the combustion chamber 73 by means of deformation caused by application of voltage and releases a closed spray hole 107 of the nozzle unit 109 by lifting the outward opening injector body 111. This operation causes the fuel to be sprayed from the spray hole 107 of the nozzle unit 109 to the combustion chamber 73 in a hollow-cone pattern. The tapered angle of the hollow cone is, for example, from 90 to 100 degrees. Upon completion of application of voltage to the piezoelectric device 113, the outward opening injector body 111 closes the spray hole 107 with the piezoelectric device 113 returning to its initial state. The recovery of the piezoelectric device 113 is promoted by the press force of the compression coil spring 117.

Figure 15:
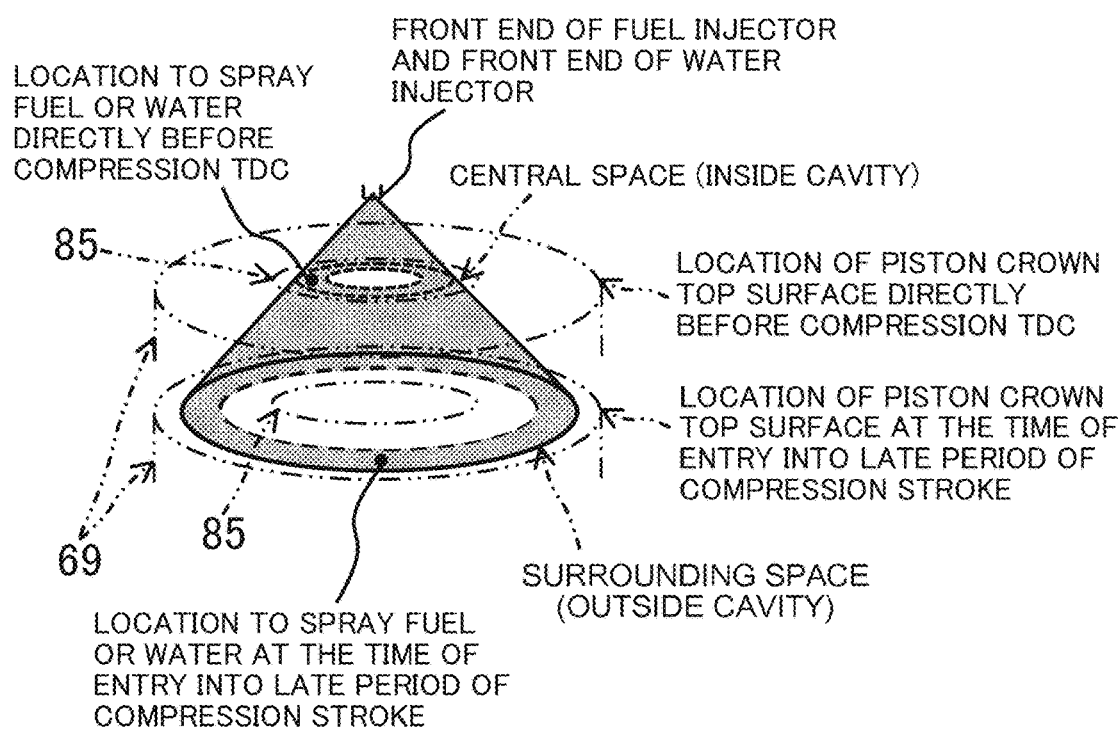
FIG. 15 illustrates an example pattern of mist sprayed from a front end of an outward opening fuel injector or water injector.

A larger voltage applied to the piezoelectric device 113 further increases the amount of lift of the outward opening injector body 111 from a closed state of the spray hole 107 of the nozzle unit 109. The spray hole 107 of the nozzle unit 109 opens wider with an increase in the amount of lift, which increases the amount of fluid (fuel and water) sprayed into the combustion chamber 73 from the spray hole 107 and increases the particle size of the sprayed mist. In the engine system 1, as illustrated in the example of FIG. 15, positions where fuel mist and water mist reach in the combustion chamber 73 vary, depending on the position of the piston 69 at the timing when the fuel injector 37 and the water injector 47 inject fuel and water and/or depending on the amounts of lift of the fuel injector 37 and the water injector 47. For example, when fuel or water is sprayed right before the piston reaches the compression top dead center (TDC), in other words, sprayed with a shorter distance between the front end of the injector and the crown top surface of the piston 69, the position at which the fuel or the water is sprayed is situated in the central space of the combustion chamber 73. For example, when fuel or water is sprayed at an early timing of the late period of the compression stroke, in other words, sprayed with a larger distance between the front end of the injector and the crown top surface of the piston 69, the position at which the fuel or the water is sprayed is situated in the surrounding space of the combustion chamber 73. This configuration allows the engine system 1 in a certain operating range to form a fuel-air mixture layer in the central space of the combustion chamber 73, in the cavity 85, and an insulating gas layer around the mixture layer and to form fuel-air mixtures having respective different equivalence ratios in the central space and the surrounding space of the combustion chamber 73.

Configurations of Sensors

As illustrated in FIGS. 1 and 2, various sensors are mounted on the engine 3, the intake air passage 5, the exhaust gas passage 7, and the EGR system 9.

Specifically, the engine 3 is equipped with a crank angle sensor 121 that detects the rotational speed of the crankshaft 72, an intake camshaft sensor 123 that detects the cam angle of an intake camshaft, an exhaust camshaft sensor 125 that detects the cam angle of an exhaust camshaft, a water temperature sensor 127 that detects the temperature of engine coolant in the water jacket.

The intake air passage 5 is provided with an airflow sensor 129 that detects the flow rate of intake air at a location immediately downstream of the air cleaner 17 and a throttle position sensor 131 that detects the opening angle of the throttle valve 19. The airflow sensor 129 has a built-in temperature sensor that detects the temperature of intake air. The exhaust gas passage 7 is provided with oxygen sensors 133 and 135 that detect the concentration of oxygen in exhaust gas at locations upstream and downstream of the exhaust gas purifier 21. Values detected by the two oxygen sensors 133 and 135 are used for feedback of the air-to-fuel ratio in the combustion chamber 73.

The EGR bypass 29 has an EGR valve position sensor 137 that detects the opening angle of the EGR valve 33. Other than these sensors, the engine system 1 includes various sensors such as a speed sensor 139 that detects the speed of the vehicle and an accelerator pedal position sensor 141 that detects how much the accelerator pedal has been depressed.

The crank angle sensor 121 detects the rotation angle of the crankshaft 72 and outputs a corresponding signal S121 to the ECU 15. The intake camshaft sensor 123 and the exhaust camshaft sensor 125 detect respective cam angles and output corresponding signals S123 and S125 to the ECU 15. The water temperature sensor 127 detects the temperature of engine coolant and outputs a corresponding signal S127 to the ECU 15.

The airflow sensor 129 detects the flow rate of intake air and the temperature of intake air using the built-in temperature sensor, and outputs respective corresponding signals S129a and S129b to the ECU 15. The oxygen sensors 133 and 135 each detect the concentration of oxygen in the exhaust gas and output corresponding signals S133 and S135 to the ECU 15. The EGR valve position sensor 137 detects the opening angle of the EGR valve 33 and outputs a corresponding signal S137 to the ECU 15. The speed sensor 139 detects the speed of the vehicle and outputs a corresponding signal S139 to the ECU 15. The accelerator pedal position sensor 141 detects how much the accelerator pedal has been depressed and outputs a corresponding signal S141 to the ECU 15.

Configuration of ECU

Figure 5:
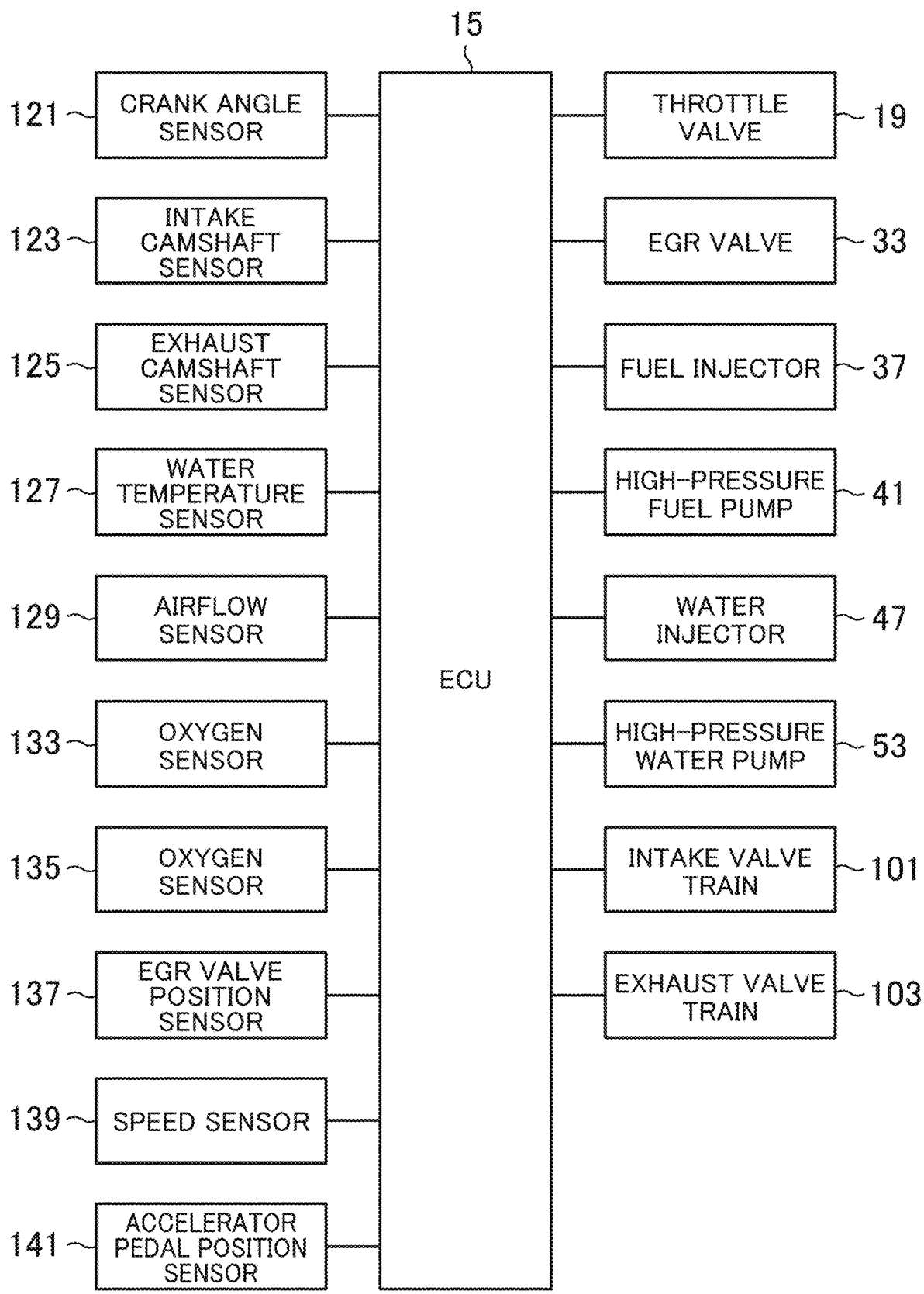
FIG. 5 is a block diagram illustrating an example configuration of an engine control system.

FIG. 5 is a block diagram illustrating an example configuration of the ECU 15.

The ECU 15 is a known microcomputer and includes a central processing unit (CPU), an internal memory such as a read only memory (ROM) and a random access memory (RAM) to store various computer programs executed by the CPU and various data, and an input-output bus to input and output electric signals. The computer programs stored in the internal memory include an operating system (OS) and an application program to implement a specific function.

The ECU 15 provides various types of control and processing based on the signals S121 to S141 transmitted from the above sensors 121 to 141. As basic functions, the ECU 15 computes a target torque, estimates the load of the engine 3, and performs other operations. Based on the computed target torque and the load of the engine 3, the ECU 15 further calculates control parameters for the engine 3 such as the opening angle of the throttle valve 19, a fuel injection pulse, a water injection pulse, the opening angle of the EGR valve 33, the phase angles of the intake valve 97 and the exhaust valve 99. The ECU 15 outputs such signals to the throttle valve 19, the fuel injector 37, the water injector 47, the EGR valve 33, the S-VT of the intake valve train 101, the S-VT of the exhaust valve train 103, and other components.

Control of Engine Operation

Figure 6:
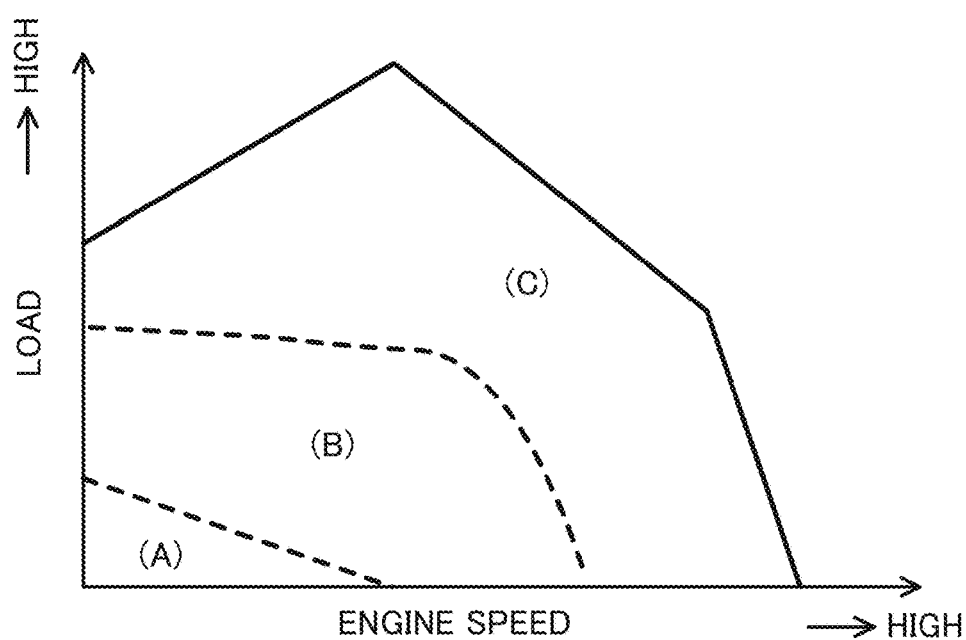
FIG. 6 is a graph of example operating ranges of the engine.

FIG. 6 is a graph of example operating ranges of the engine 3.

As illustrated in FIG. 6, the engine 3 has three separate operating ranges; a low-load region (A), a mid-load region (B), and a high-load region (C). The low-load region (A) is a range of low engine speeds and low loads. The mid-load region (B) is a range of higher loads and higher engine speeds than those of the low-load region (A). The high-load region (C) is a range of higher loads and higher engine speeds than those of the mid-load region (B).

The engine system 1 is basically designed to burn fuel injected to the combustion chamber 73 by means of compression ignition in all the operating ranges; the low-load region (A), the mid-load region (B), and the high-load region (C). The compression-ignition combustion is, in other words, controlled auto ignition (CAI) combustion. Such CAI combustion is stabilized when the engine 3 is set at high geometrical compression ratios as described above.

As described above, the ECU 15 outputs signals relating to operating conditions of the engine 3 to the throttle valve 19, the fuel injector 37, the water injector 47, the EGR valve 33, the S-VT of the intake valve train 101, and the S-VT of the exhaust valve train 103. These output signals are used to control the state of gas in the combustion chamber 73 based on the operating conditions of the engine 3. The EGR system 9 is basically designed to introduce exhaust gas (burnt gas) into the combustion chamber 73 in all the operating ranges of the engine 3.

The ECU 15 uses respective different fuel injection strategies to inject fuel to the combustion chamber 73 among the low-load region (A), the mid-load region (B), and the high-load region (C).

Fuel Injection Strategy in Low-Load Region (A)

In the low-load region (A), the engine system 1 forms an insulating layer comprised as a gas layer along the defining wall surfaces 75, 77, and 79 of the combustion chamber 73 in combustion. Such an insulating layer added to the heat shielding structure of the combustion chamber 73 allows a considerable reduction in cooling loss of the engine 3. This low-load region (A) is an example of a first operating range.

In the low-load region (A), the ECU 15 causes the fuel injector 37 to inject the fuel F into the cavity 85 in and after the compression stroke. This injection causes stratification that forms a fuel-air mixture layer, at a location close to the fuel injector 37, in the center portion inside the cavity 85 and forms a gas layer containing fresh air around the fuel-air mixture layer. The gas layer may contain only fresh air or may contain burnt gas, derived from the external EGR and the internal EGR, in addition to the fresh air. The gas layer can contain a small amount of fuel as long as the fuel in the gas layer is leaner than the combustible mixture.

When the fuel-air mixture is burnt by compression ignition in the combustion chamber 73 where the mixture layer and the gas layer are formed, the gas layer between the mixture layer and the defining wall surfaces 75, 77, and 79 of the combustion chamber 73 can keep the flames from contacting the defining wall surface 77 of the cylinder 63. In addition, the gas layer serves as an insulating layer, which can reduce heat dissipated through the defining wall surfaces 75, 77, and 79 of the combustion chamber 73. Consequently, this configuration can markedly reduce the cooling loss.

Unfortunately, a reduction in the cooling loss does not much contribute to improvement in the thermal efficiency, because the reduced cooling loss is converted into exhaust heat loss. This engine 3, however, converts the energy of burnt gas corresponding to the reduced cooling loss into mechanical work at a high expansion ratio. The engine 3 employs such a configuration that can reduce both the cooling loss and exhaust heat loss, whereby the thermal efficiency is markedly improved.

In forming the mixture layer and the gas layer in the combustion chamber 73, it is preferable that the gas flux in the combustion chamber 73 be small at the timing of fuel injection. The intake port 93 therefore has a straight shape in which a swirl flow is not generated or hardly generated in the combustion chamber 73, and is also designed to make as small a tumble flow as possible.

Fuel Injection Strategy in High-Load Region (C)

For the high-load region (C), the engine system 1 employs a fuel injection strategy different from that for the low-load region (A) with the intention to reduce combustion noise and maintain stability of combustion. This high-load region (C) is an example of a second operating range.

Figure 7:
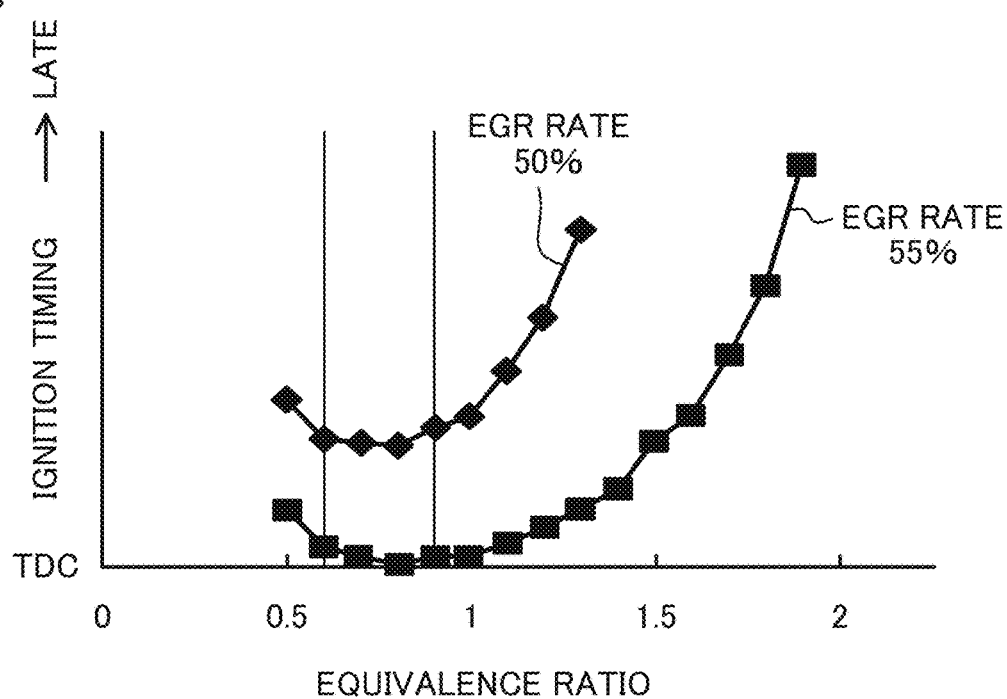
FIG. 7 is a graph of example relation between the equivalence ratio of a fuel-air mixture and the timings of ignition.

FIG. 7 illustrates the relation between the equivalence ratio of a fuel-air mixture and the timing of ignition of the mixture. In FIG. 7, one of two lines indicates a condition where the EGR rate, the mass ratio of exhaust gas to all gases in the combustion chamber 73, is 50%. The other line indicates a condition where the EGR rate is 55%, higher than that of the first line. The difference in EGR rate derives from a difference in temperature in the combustion chamber 73 before compression. The temperature at an EGR rate of 55% is higher than that at an EGR rate of 50%. The 55% EGR rate is therefore advantageous in ignitability compared to the 50% EGR rate. In other words, ignition with the 55% EGR rate tends to be advanced, compared to ignition at the 50% EGR rate.

From FIG. 7, when the equivalence ratio of fuel-air mixture is equal to or small than 1, the ignition timing is further retarded with a decrease in the equivalence ratio, regardless of the level of the EGR rate. In other words, the fuel-air mixture becomes leaner and more difficult to burn with a decrease in the amount of fuel in the combustion chamber 73. When the equivalence ratio of fuel-air mixture is larger than 1, the ignition timing is further retarded with an increase in the equivalence ratio, regardless of the level of the EGR rate. The retarded ignition occurs because an increase in the amount of fuel injected to the combustion chamber 73 causes the temperature of the combustion chamber 73 to locally drop due to latent heat and sensible heat of the fuel. Ignition increasingly becomes difficult as the temperature drops. When the equivalence ratio of fuel-air mixture is in the range from 0.6 to 0.9, the ignition timing becomes most advanced, regardless of the level of the EGR rate. Ignitability of the fuel-air mixture is therefore most enhanced in this range.

As described above, a difference in the equivalence ratio of a fuel-air mixture varies ignitability of the fuel-air mixture, that is, the ignition timing of the fuel-air mixture. For such relation between the equivalence ratio and the ignition timing of a fuel-air mixture, the engine system 1 has the combustion chamber 73 spatially divided into a plurality of mixture zones ZI, ZR, and ZL, containing fuel-air mixtures having respective different equivalence ratios, by injecting the fuel-air mixture at separate times in the high-load region (C). The fuel-air mixtures in the mixture zones ZI, ZR, and ZL undergo compression-ignition combustion at respective different timings, which can achieve stable ignition at around the combustion top dead center and slow combustion. This manner allows a reduction in combustion noise and more stable combustion in the high-load region (C).

Figure 8:
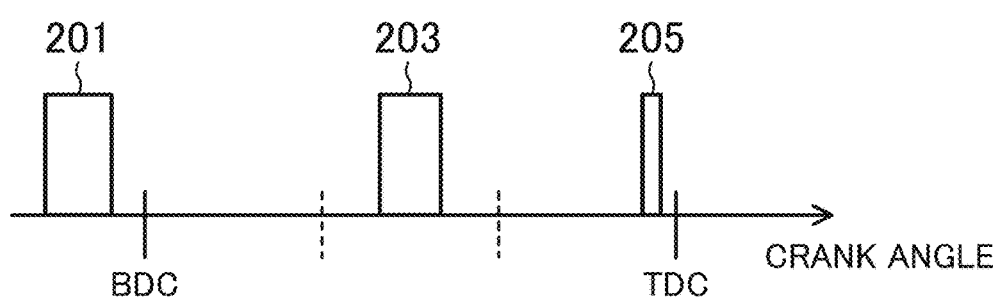
FIG. 8 exemplarily illustrates timings of fuel injections and the respective amounts of injection in a high-load region.

FIG. 8 exemplarily illustrates the timings when the fuel injector 37 injects the fuel F into the combustion chamber 73 and the respective amounts of injection in the high-load region (C). In FIG. 8, the crankshaft angle (that is, the time) proceeds from left to right. The amount of injected fuel F is represented by the area of a rectangle, and a larger area indicates a larger amount of injection of the fuel F. FIG. 9A to FIG. 9H each exemplarily conceptually illustrate fuel injection, conditions of a fuel-air mixture formed in the combustion chamber 73, and combustion of the fuel-air mixture, in the high-load region (C).

Figure 9A:
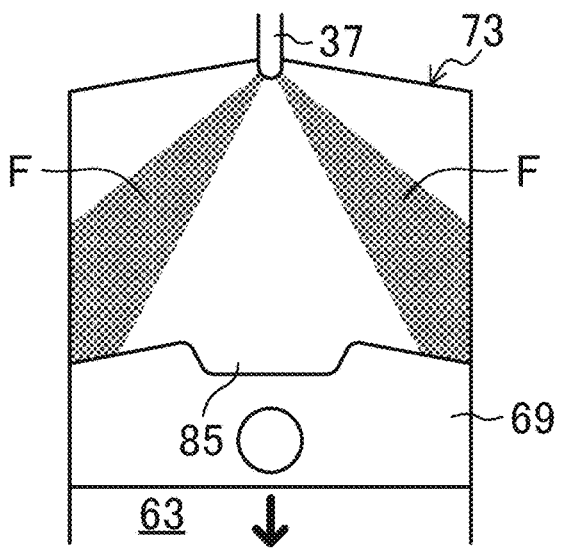
FIG. 9A exemplarily conceptually illustrates fuel injection in an intake stroke in the high-load region.

As illustrated in FIG. 8 and FIG. 9A, the fuel injector 37 receives a signal from the ECU 15 and conducts a fuel injection 201 to the combustion chamber 73 during the intake stroke. The fuel injection 201 in the intake stroke will be hereinafter referred to as an "intake-stroke injection". The intake-stroke injection 201 takes place, for example, in the second half of the intake stroke. More precisely, the second half is the second half of the intake stroke equally divided into the first half and the second half. The intake-stroke injection 201 may take place in a late period of the intake stroke. The late period is the last period of the intake stroke equally divided into early, mid-, and late periods. A comparatively large amount of fuel F is injected by the intake-stroke injection 201. The intake-stroke injection 201 produces a lean, homogeneous or substantially homogeneous fuel-air mixture entirely over the combustion chamber 73. The equivalence ratio of the mixture formed at this stage is set from 0.4 to 0.6.

Figure 9B:
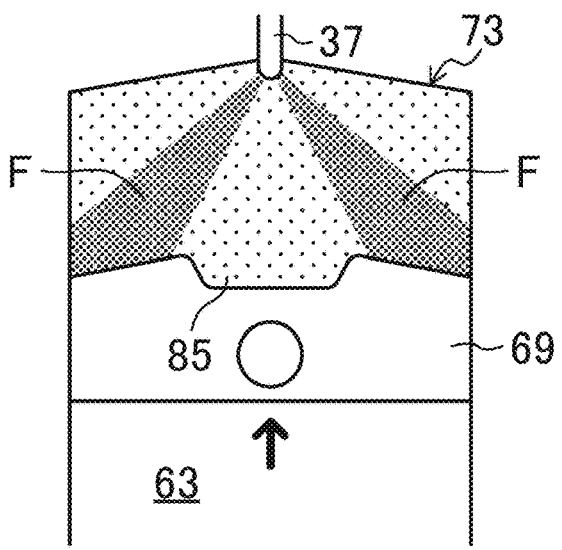
FIG. 9B exemplarily conceptually illustrates fuel injection in a mid-period of a compression stroke in the high-load region.

As illustrated in FIG. 8 and FIG. 9B, the fuel injector 37 receives a signal from the ECU 15 and conducts a fuel injection 203 in the mid-period of the compression stroke. The fuel injection 203 in the mid-period of the compression stroke will be hereinafter referred to as a "compression-stroke mid-period injection". The compression-stroke mid-period injection 203 is an example of a second fuel injection. The mid-period corresponds to the mid-period of the compression stroke equally divided into early, mid-, and late periods. The amount of fuel F injected by the compression-stroke mid-period injection 203 is smaller than that of the intake-stroke injection 201.

Figure 9C:
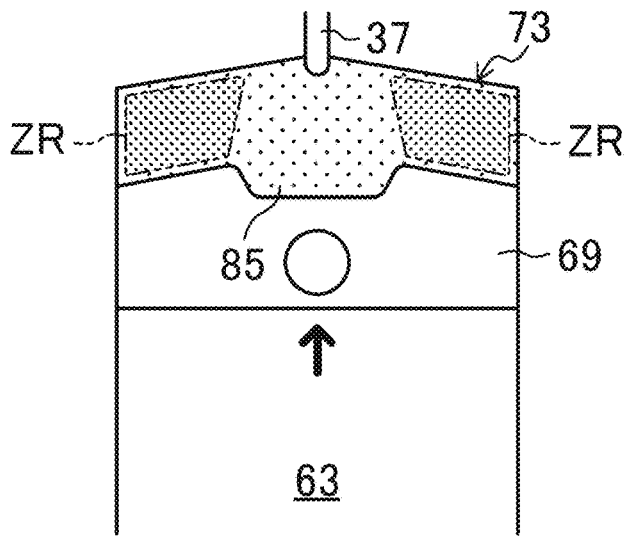
FIG. 9C exemplarily conceptually illustrates conditions of a fuel-air mixture formed in the combustion chamber in the high-load region.

Because the combustion chamber 73 has comparatively low pressure and the piston 69 is located at a comparatively lower position, the fuel F injected by the compression-stroke mid-period injection 203 reaches the outer periphery of the cavity 85, that is, the surrounding space of the combustion chamber 73. As illustrated in FIG. 9C, these injections cause the fuel F injected by the intake-stroke injection 201 and the fuel F injected by the compression-stroke mid-period injection 203 to be mixed in the surrounding space of the combustion chamber 73, whereby a zone ZR containing a resulting over-dense mixture is formed in this space. The equivalence ratio of this mixture in the zone ZR is set from 1.0 to 1.7. The zone ZR containing such an over-dense mixture will be referred to as an "over-dense zone".

Figure 9D:
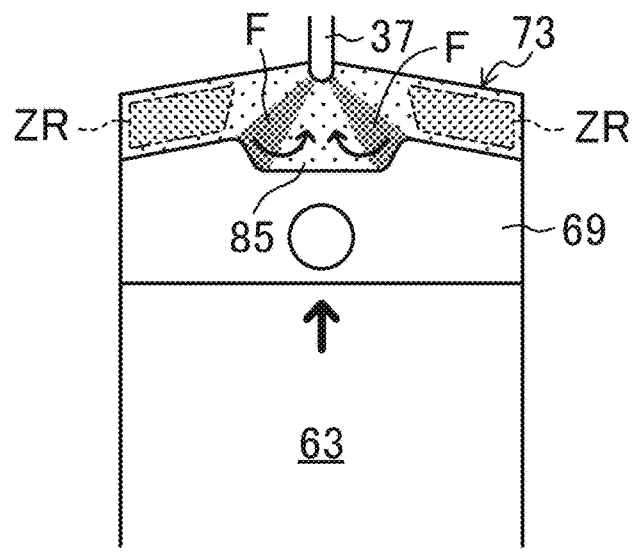
FIG. 9D exemplarily conceptually illustrates fuel injection at around a compression top dead center in the high-load region.

As illustrated in FIG. 8 and FIG. 9D, the fuel injector 37 receives a signal from the ECU 15 and conducts a fuel injection 205 in the late period of the compression stroke, more precisely, at around the top dead center, to the combustion chamber 73. The fuel injection 205 will be hereinafter referred to as a "compression top-dead-center injection". The compression top-dead-center injection 205 is an example of a first fuel injection. The late period corresponds to the last period of the compression stroke equally divided into early, mid-, and late periods. The amount of fuel F injected by the compression top-dead-center injection 205 is smaller than that of the compression-stroke mid-period injection 203.

Figure 9E:
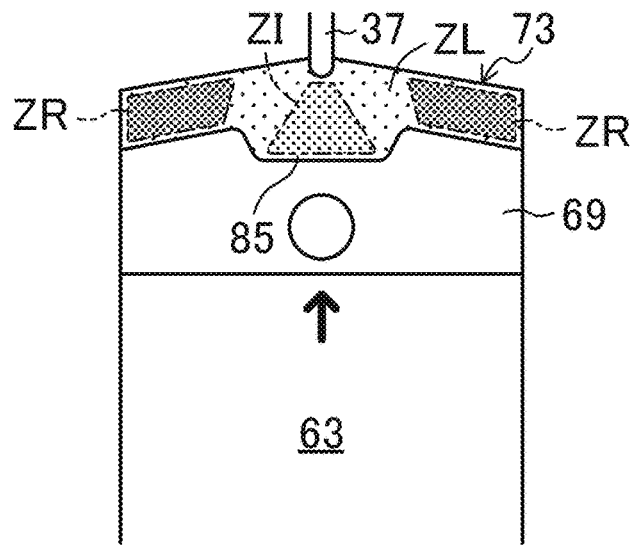
FIG. 9E exemplarily conceptually illustrates conditions of a fuel-air mixture formed in the combustion chamber in the high-load region.

Because the combustion chamber 73 has high pressure and the piston 69 is located at a comparatively upper position, the fuel F injected by the compression top-dead-center injection 205 remains in the cavity 85, in the central space of the combustion chamber 73. As illustrated in FIG. 9E, this injection strategy causes the fuel F injected by the intake-stroke injection 201 and the fuel F injected by the compression top-dead-center injection 205 to be mixed in the central space of the combustion chamber 73, whereby a zone ZI containing a resulting easy-ignitable mixture having a predetermined equivalence ratio is formed in this space. The equivalence ratio of this mixture in the zone ZI is set from 0.6 to 0.9. As described with reference to FIG. 7, the equivalence ratios in this range achieve the highest ignitability of the mixture. The zone ZI containing such an easy-ignitable mixture will be referred to as an "ignition zone".

At this stage, a zone ZL that contains a leaner mixture having an equivalence ratio smaller than that of the ignition zone ZI is formed between the ignition zone ZR and the over-dense zone ZI. The fuel-air mixture in the zone ZL is formed by the intake-stroke injection 201. The equivalence ratio of the fuel-air mixture is therefore set from 0.4 to 0.6. The zone ZL containing such a leaner mixture will be referred to as a "lean zone".

The combustion chamber 73 therefore has three zones, the ignition zone ZI, the lean zone ZL, and the over-dense zone ZR, from the center thereof toward the outside. The zones ZI, ZL, and ZR have respective different equivalence ratios. The average equivalence ratio of the mixture throughout the combustion chamber 73 is 1. This manner allows a three-way catalyst of the exhaust gas purifier 21 to clean the exhaust gas. The amounts of fuel F injected by the intake-stroke injection 201, the compression-stroke mid-period injection 203, and the compression top-dead-center injection 205 are set in the ratio of, for example, 0.55:0.42:0.03.

Figure 9F:
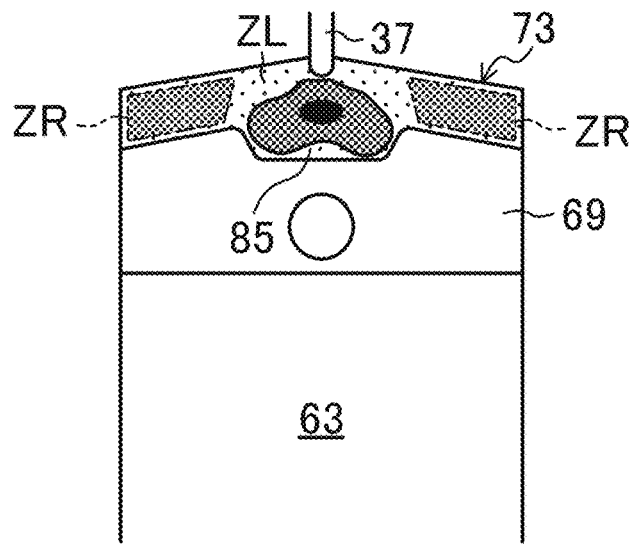
FIG. 9F exemplarily conceptually illustrates combustion of a fuel-air mixture in the combustion chamber in the high-load region.

As illustrated in FIG. 9F, when the piston 69 reaches the top dead center, the temperature and the pressure of the combustion chamber 73 rise, and the easiest ignitable mixture of the ignition zone ZI located in the central space of the combustion chamber 73 is ignited by compression and starts burning. The fuel contained in the ignition zone ZI is only a part of the fuel supplied to the combustion chamber 73, which can keep the pressure of the combustion chamber 73 from sharply rising due to the burning in the ignition zone ZI.

Figure 9G:
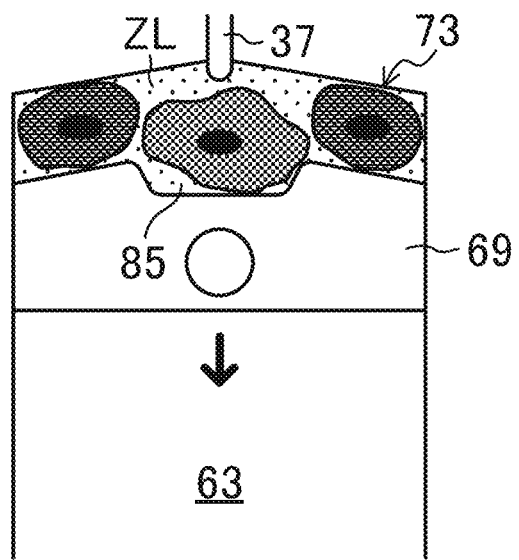
FIG. 9G exemplarily conceptually illustrates combustion of a fuel-air mixture in the combustion chamber in the high-load region.

As the fuel-air mixture in the ignition zone ZI burns, the temperature and the pressure of the combustion chamber 73 rise. The second easiest ignitable mixture of the over-dense zone ZR located in the surrounding space of the combustion chamber 73 is subsequently ignited by compression and starts burning, as illustrated in FIG. 9G.

Figure 9H:
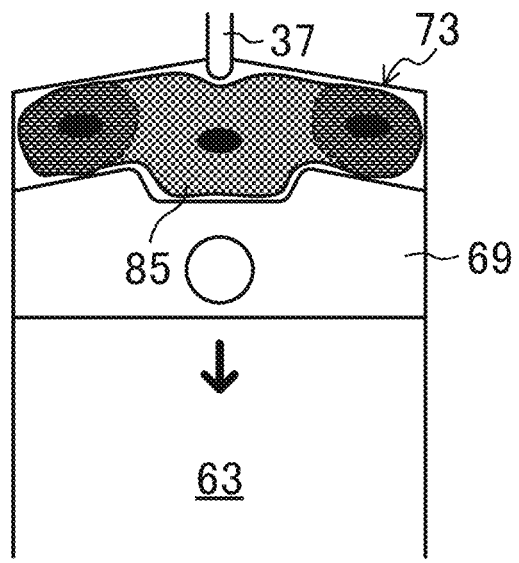
FIG. 9H exemplarily conceptually illustrates combustion of a fuel-air mixture in the combustion chamber in the high-load region.

Then, the lean zone ZL is ignited by compression and starts burning, as illustrated in FIG. 9H. The fuel-air mixture in the lean zone ZL has the largest volume and therefore has a higher rate of heat release. The mixture in the lean zone ZL, however, starts burning after the expansion stroke proceeds, which keeps the pressure from sharply rising due to the burning of the mixture.

In this manner, formation of three zones; the ignition zone ZI, the lean zone ZL, and the over-dense zone ZR, in the combustion chamber 73 enables combustion to slowly proceed while ignitability is maintained in the high-load region (C). This configuration can therefore achieve a reduction in combustion noise and more stable combustion at the same time.

The fuel injection strategy illustrated in FIG. 8 is particularly advantageous in injecting a large amount of fuel to the combustion chamber 73. More specifically, a larger amount of injection in the compression-stroke mid-period injection 203 causes penetration, in other words, extends the distance in which mist of the fuel F travels. This manner allows the mist of the fuel F to reach the outer peripheral portion of the combustion chamber 73, which is remote from the fuel injector 37. Furthermore, a large amount of air, present in the outer peripheral portion of the combustion chamber 73, can be used for the combustion. This manner allows the combustion chamber 73 to be supplied with an increased amount of fuel, while keeping the equivalence ratio in the over-dense zone ZR from being excessively high.

In the fuel injection strategy illustrated in FIG. 8, a fuel-air mixture having an equivalence ratio from 0.6 to 0.9 is formed by the compression top-dead-center injection 205, and the amount of injected fuel F is therefore comparatively small. The duration of injection of the fuel F is short in the compression top-dead-center injection 205, which makes the time from completion of injection to ignition long. A sufficient time is therefore allowed for the fuel F, injected into the combustion chamber 73 by the compression top-dead-center injection 205, to vaporize and mix with air. Problems such as generation of smoke are less likely to occur, and the quality of the exhaust gas is therefore less likely to be worse. This advantageous effect is similarly exerted in a situation where the crankshaft rotates the same degrees of angle in a relatively shorter time with an increase in the engine speed of the engine 3. The fuel injection strategy illustrated in FIG. 8 is therefore advantageous in keeping the quality of the exhaust gas from being reduced when the engine speed of the engine 3 is high.

Figure 10:
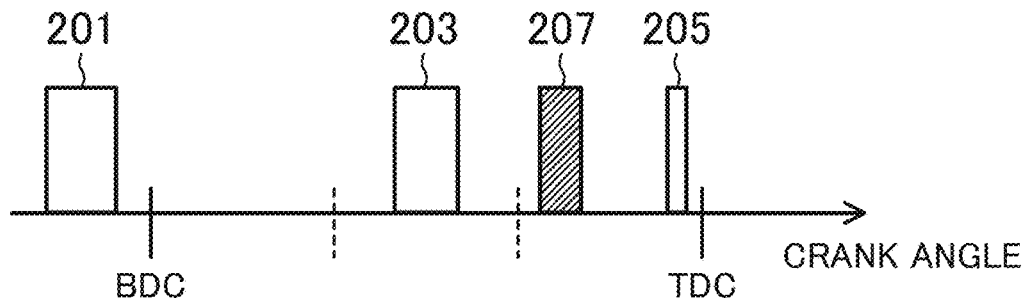
FIG. 10 exemplarily illustrates timings of fuel and water injections and the respective amounts of injection in the high-load region.
Figure 11:
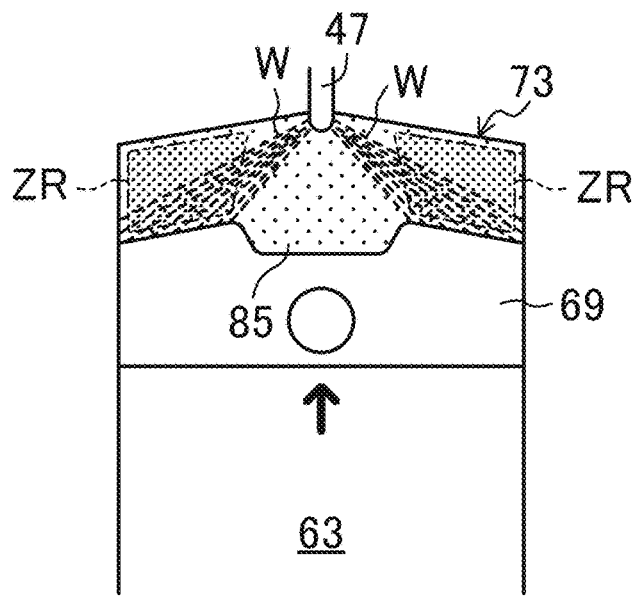
FIG. 11 exemplarily conceptually illustrates water injection in the late-period of the compression stroke in the high-load region.

FIG. 10 exemplarily illustrates timings when the fuel F and the water W are injected and the respective amounts of injection in the high-load region (C). FIG. 11 exemplarily conceptually illustrates water injection in the late period of the compression stroke in the high-load region (C).

The above fuel injection strategy in the high-load region (C) conducts the fuel injection 203, which is for formation of the over-dense zone ZR, at a comparatively early timing, in the mid-period of the compression stroke so as to avoid insufficient mixing of the fuel F and air, which often results in generation of smoke and a reduction in the fuel efficiency. This manner problematically extends the duration in which the fuel-air mixture to form the over-dense zone ZR is exposed to high-temperature environments in the combustion chamber 73. In addition, the heat shielding layers 92 are formed over the crown top surface 75 of the piston 69 and the lower surface 79 of the cylinder head 67 including the portions facing the surrounding space, in which the over-dense zone ZR is formed, of the combustion chamber 73. The temperature of the surrounding space of the combustion chamber 73 is difficult to drop because of the heat shielding layer 92. The fuel-air mixture in the over-dense zone ZR is supposed to be ignited in a delayed manner, however, this fuel injection strategy is likely to cause abnormal combustion of the mixture, and to cause pre-ignition.

With the intention to prevent pre-ignition of the over-dense zone ZR, the engine system 1 conducts a water injection 207 to inject the water W to the surrounding space, in which the over-dense zone ZR is formed, of the combustion chamber 73 at a proper timing. More specifically, the water injector 47 receives a signal from the ECU 15 and conducts the water injection 207 in the late period of the compression stroke, specifically, before the compression top-dead-center injection 205 is conducted, as illustrated in FIGS. 10 and 11. The water injection 207 may be conducted after the compression-stroke mid-period injection 203 in the mid-period of the compression stroke. The water injection 207 needs to be conducted at a timing from the commencement of the compression-stroke mid-period injection 203 to the commencement of the compression top-dead-center injection 205.

When the water W is injected to the outer peripheral portion of the combustion chamber 73, the latent heat and sensible heat of the water W cause the over-dense zone ZR (which means, the space itself and the fuel-air mixture in the zone ZR) formed in the surrounding space of the combustion chamber 73 to be locally cooled in the combustion chamber 73. Although high temperatures in the combustion chamber 73 are likely to cause abnormal combustion and thus to cause pre-ignition, this local cooling and a drop in temperature of the over-dense zone ZR make the fuel-air mixture in this zone more difficult to be ignited by compression. This manner therefore ensures that the fuel-air mixture in the over-dense zone ZR is ignited in a delayed manner after ignition of the fuel-air mixture in the ignition zone ZI formed in the central space of the combustion chamber 73. The fuel-air mixture in the ignition zone ZI and the fuel-air mixture in the over-dense zone ZR are therefore allowed to be ignited by compression with a certain time lag constantly interposed therebetween.

Fuel Injection Strategy in Mid-Load Range (B)

For the mid-load region (B), the engine system 1 employs a fuel injection strategy different from those of the low-load region (A) and the high-load region (C), with the intention to reduce generation of smoke, resulting from insufficient amount of air in formation of the over-dense zone ZR, and to avoid abnormal combustion (such as pre-ignition), caused with the fuel-air mixture in the over-dense zone ZR exposed to high-temperature and high-pressure environments for a longer time.

Figure 12:
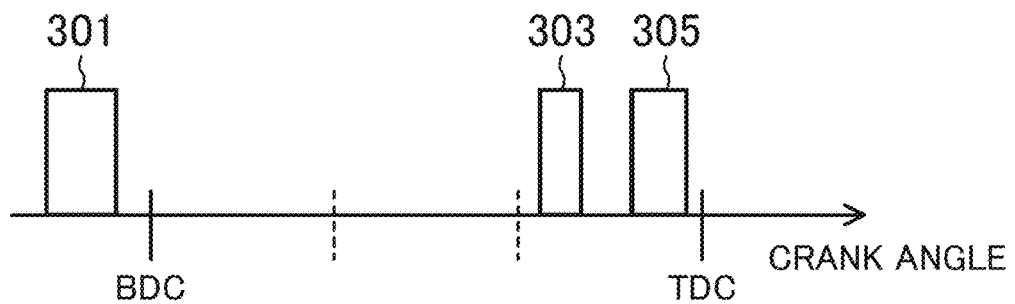
FIG. 12 exemplarily illustrates timings of fuel injections and the respective amounts of injection in a mid-load region.

FIG. 12 exemplarily illustrates timings when the fuel injector 37 injects the fuel F into the combustion chamber 73 and the respective amounts of injection in the mid-load region (B). The fuel F injection strategy of FIG. 12 and that of FIG. 8 are based on the same load of the engine 3. FIG. 13A to FIG. 13H each exemplarily conceptually illustrate fuel injection, conditions of a fuel-air mixture formed in the combustion chamber 73, and combustion of the fuel-air mixture, in the mid-load region (B).

Figure 13A:
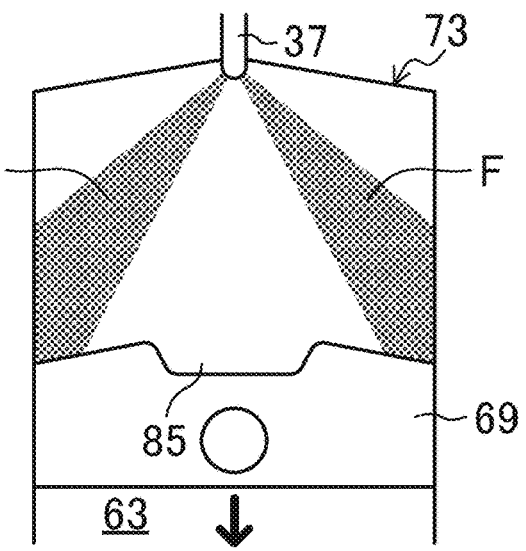
FIG. 13A exemplarily conceptually illustrates fuel injection in the intake stroke in the mid-load region.

As illustrated in FIGS. 12 and 13A, the fuel injector 37 receives a signal from the ECU 15 and conducts a fuel injection 301 to the combustion chamber 73 during the intake stroke. The intake-stroke injection 301 takes place, for example, in the second half of the intake stroke. A comparatively large amount of fuel F is injected in the intake-stroke injection 301. The intake-stroke injection 301 produces a lean, homogeneous or substantially homogeneous mixture entirely over the combustion chamber 73. The equivalence ratio of the fuel-air mixture produced at this stage is from 0.4 to 0.6. The intake-stroke injection 301 is substantially the same as the intake-stroke injection 201 illustrated in FIG. 8.

Figure 13B:
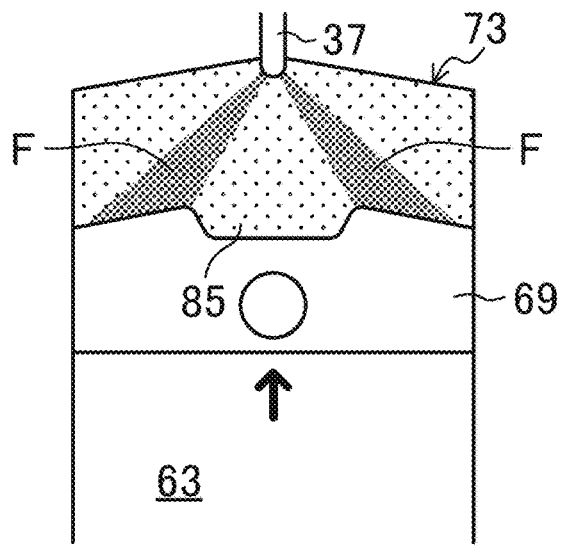
FIG. 13B exemplarily conceptually illustrates fuel injection in the late-period of the compression stroke in the mid-load region.

As illustrated in FIGS. 12 and 13B, the fuel injector 37 receives a signal from the ECU 15 and conducts a fuel injection 303 in the late period of the compression stroke. The fuel injection 303 will be hereinafter referred to as a "compression-stroke late-period injection". The amount of injection of the fuel F in the compression-stroke late-period injection 303 is smaller than that in the intake-stroke injection 301 and also smaller than that in the later-described compression top-dead-center injection 305.

Figure 13C:
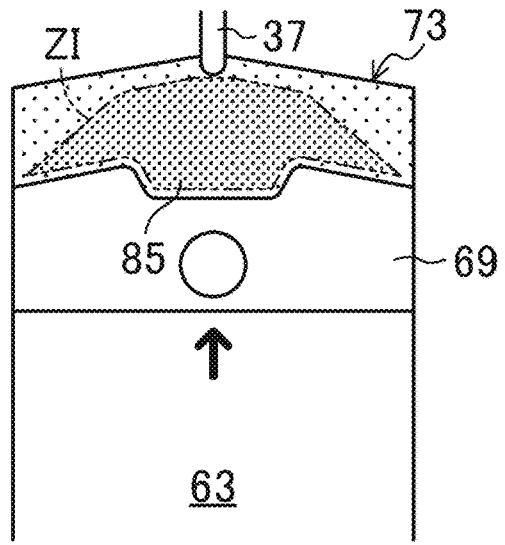
FIG. 13C exemplarily conceptually illustrates conditions of a fuel-air mixture formed in the combustion chamber in the mid-load region.

As the piston 69 approaches the compression top dead center, the combustion chamber 73 has high pressure, which high pressure makes the fuel F injected by the compression-stroke late-period injection 303 difficult to reach the outer peripheral portion of the combustion chamber 73. As illustrated in FIG. 13C, this injection strategy causes the fuel F injected by the intake-stroke injection 301 and the fuel F injected by the compression-stroke late-period injection 303 to be mixed in a certain area, of the combustion chamber 73, excluding the outer peripheral portion, in other words, in the central space and a portion, of the surrounding space, close to the central space. This process forms the ignition zone ZI containing a resulting mixture having an equivalence ratio from 0.6 to 0.9 in this area.

Figure 13D:
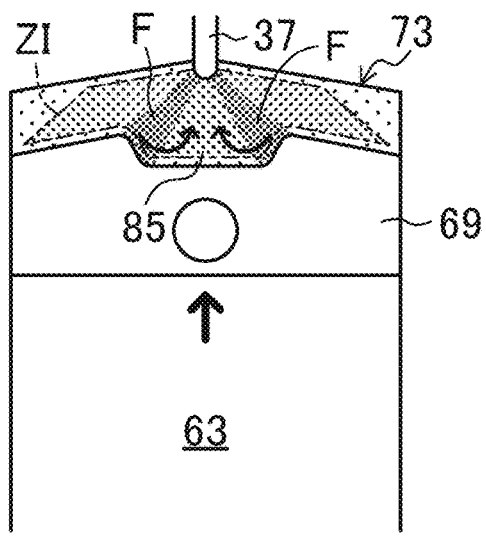
FIG. 13D exemplarily conceptually illustrates fuel injection at around the compression top dead center in the mid-load region.

As illustrated in FIG. 12 and FIG. 13D, the fuel injector 37 receives a signal from the ECU 15 and conducts a compression top-dead-center injection 305. The amount of fuel F injected by the compression top-dead-center injection 305 is smaller than that of the intake-stroke injection 301 and larger than that of the compression-stroke late-period injection 303.

Figure 13E:
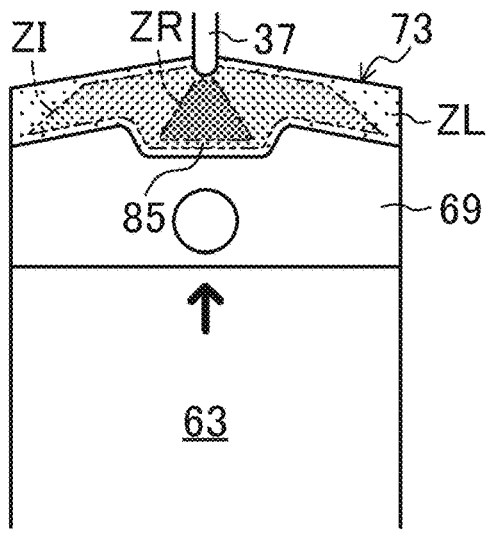
FIG. 13E exemplarily conceptually illustrates conditions of a fuel-air mixture formed in the combustion chamber in the mid-load region.

Because the combustion chamber 73 has high pressure and the piston 69 is located at an upper position, the fuel F injected by the compression top-dead-center injection 305 remains in the cavity 85. As illustrated in FIG. 13E, this injection strategy causes the fuel F injected by the intake-stroke injection 301, the fuel F injected by the compression-stroke late-period injection 303, and the fuel F injected by the compression top-dead-center injection 305 to be mixed in the central space of the combustion chamber 73. This process forms the over-dense zone ZR containing a resulting significantly dense mixture, having an equivalence ratio from 1.0 to 1.7, in this space.

In this stage, the lean zone ZL that contains a lean mixture having an equivalence ratio smaller than that of the ignition zone ZI is formed outside the ignition zone ZR. The fuel-air mixture in the lean zone is formed by the intake-stroke injection 301. The equivalence ratio of the fuel-air mixture is therefore set from 0.4 to 0.6.

The combustion chamber 73 consequently has three zones, the over-dense zone ZR, the ignition zone ZI, and the lean zone ZL, from the center thereof toward the outside. The zones ZR, ZI, and ZL have respective different equivalence ratios. The average equivalence ratio of the fuel-air mixture throughout the combustion chamber 73 is 1. The amounts of fuel F injected by the intake-stroke injection 301, the compression-stroke late-period injection 303, and the compression top-dead-center injection 305 are set in the ratio of, for example, 0.55:0.14:0.31.

Figure 13F:
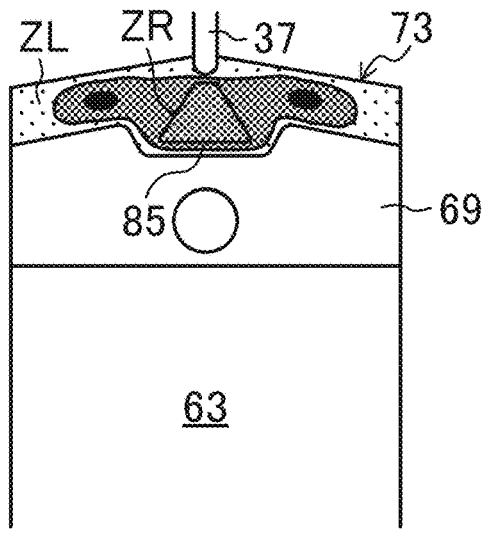
FIG. 13F exemplarily conceptually illustrates combustion of a fuel-air mixture in the combustion chamber in the mid-load region.
Figure 13G:
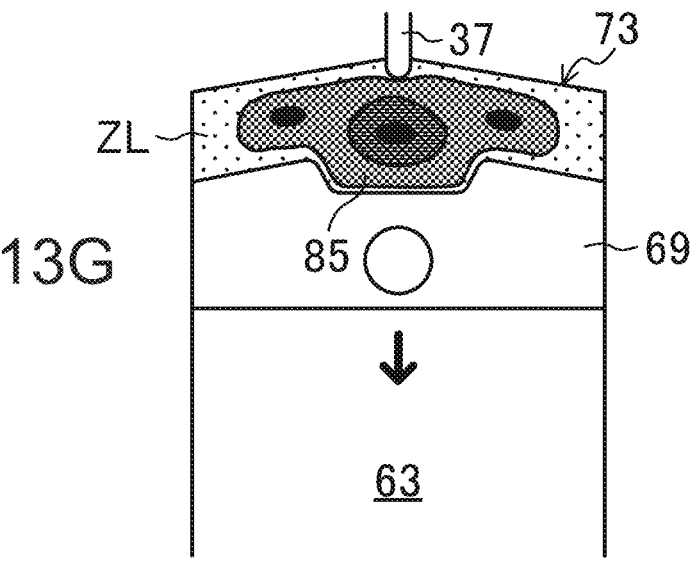
FIG. 13G exemplarily conceptually illustrates combustion of a fuel-air mixture in the combustion chamber in the mid-load region.
Figure 13H:
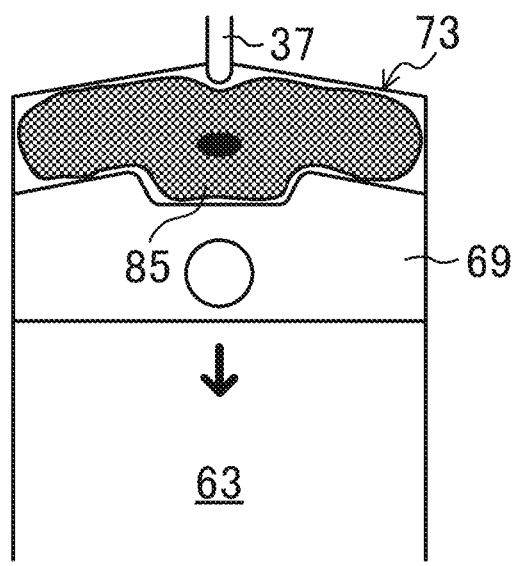
FIG. 13H exemplarily conceptually illustrates combustion of a fuel-air mixture in the combustion chamber in the mid-load region.

When the piston 69 reaches the compression top dead center, the temperature and the pressure of the combustion chamber 73 rise, and the fuel-air mixture in the ignition zone ZI is ignited by compression and starts burning as illustrated in FIG. 13F. The over-dense zone ZR is subsequently ignited by compression and starts burning, as illustrated in FIG. 13G. Then, the lean zone ZL is ignited by compression and starts burning, as illustrated in FIG. 13H.

Such formation of fuel-air mixtures illustrated in FIG. 13E is beneficial in keeping the over-dense mixture from contacting the wall surface of the combustion chamber 73, compared to the formation of mixtures in FIG. 9E. This injection strategy can therefore reduce cooling loss. The concentration of fuel in the fuel-air mixture becomes gradually smaller from the center toward the outside of the combustion chamber 73, in other words, the outer peripheral portion of the combustion chamber 73 has a fuel-air mixture containing a small amount of fuel. The amount of unburnt fuel is therefore reduced. With such a reduction in cooling loss and a reduction in loss of unburnt fuel, the formation of fuel-air mixtures illustrated in FIG. 13E is advantageous in improving the fuel efficiency compared to the formation of mixtures illustrated in FIG. 9E.

Furthermore, in the fuel injection strategy illustrated in FIG. 12, the fuel to form the over-dense zone ZR is injected at around the compression top dead center. This injection strategy can therefore reduce the duration in which the over-dense mixture is exposed to a high-temperature high-pressure atmosphere in the combustion chamber 73. The fuel injection strategy illustrated in FIG. 12 can sustain robust injection against abnormal combustion, compared to the fuel injection strategy illustrated in FIG. 8. The fuel injection strategy illustrated in FIG. 12 is further advantageous in avoiding abnormal combustion, which is likely to be caused by, for example, high outside temperatures.

Fuel Injection Control and Water Injection Control

Figure 14:
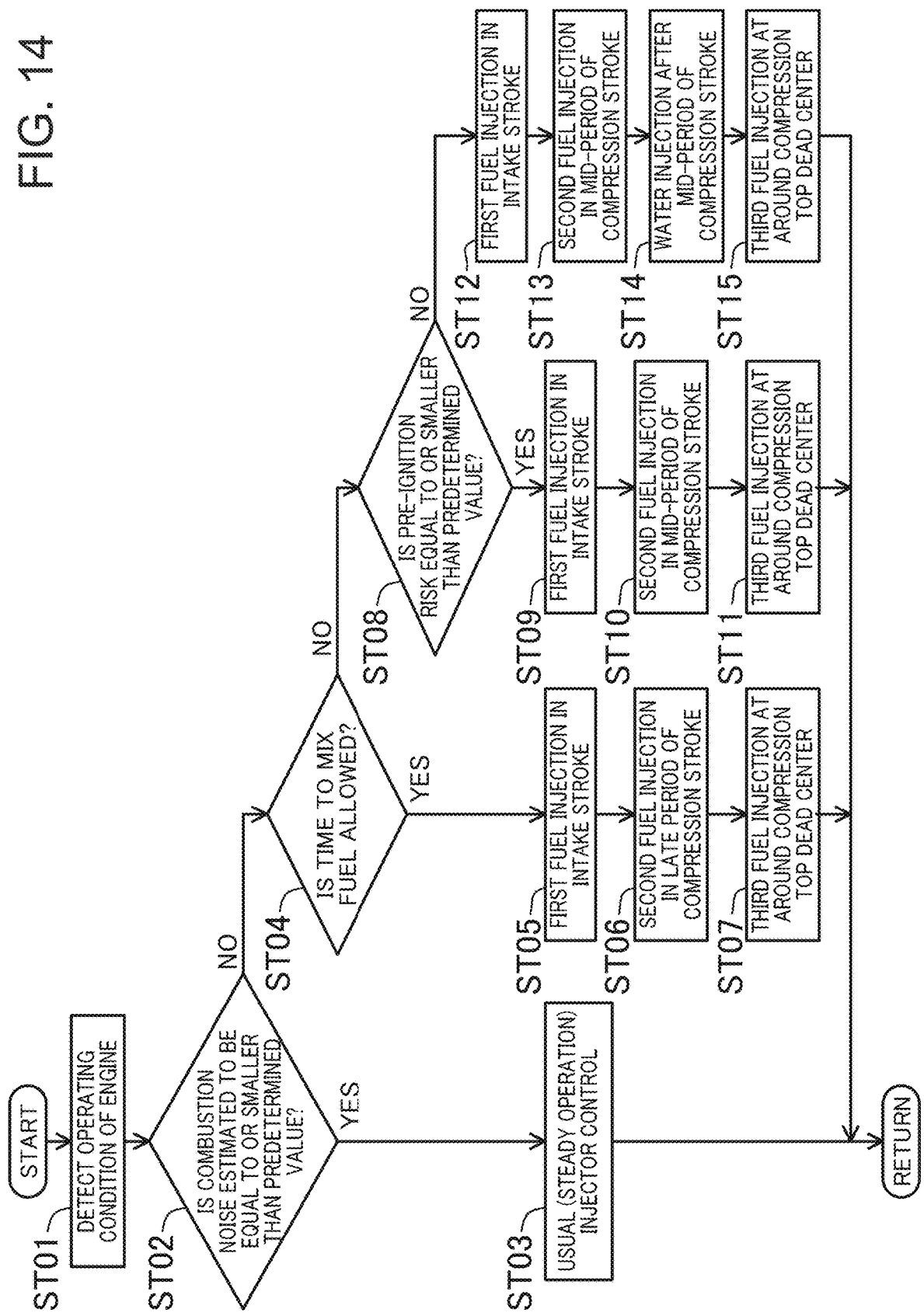
FIG. 14 is a flowchart of example fuel injection control and water injection control which are conducted by an engine control unit (ECU).

FIG. 14 illustrates an example flowchart relating to fuel injection control and water injection control conducted by the ECU 15. Fuel injections 201 to 205 and 301 to 305 and a water injection 207 to the combustion chamber 73 of the engine system 1 are carried out in accordance with the flow of FIG. 14.

At Step ST01, the ECU 15 detects operating conditions of the engine 3 based on the signals S121 to S141 transmitted from the sensors 121 to 141. More specifically, the ECU 15 detects, for example, the engine speed of the engine 3, the load of the engine 3, the intake air temperature, and the EGR rate.

At the subsequent step ST02, the ECU15 determines whether combustion noise of the fuel-air mixture is estimated to be equal to or smaller than a tolerance, based on the operating conditions of the engine 3. If the ECU15 determines that the combustion noise of the fuel-air mixture would be equal to or smaller than the tolerance (Yes), the process proceeds to Step ST03. If the ECU15 determines that the combustion noise of the fuel-air mixture would exceed the tolerance (No), the process proceeds to Step ST04.

At Step ST03, the ECU 15 conducts a first injection control. The first injection control corresponds to the fuel injection control in the low-load region (A) in FIG. 6. At Step ST03, if the engine 3 is cold, the ECU 15 conducts a water injection, which causes the water injector 47 to inject water, at the same timing as that of the water injection 207 in the high-load region (C). The ECU 15 outputs a signal to the water injector 47 and conducts a water injection during the compression stroke. The water injection may be conducted after the fuel injection or before the fuel injection.

A water injection conducted during the engine 3 is cold decreases the temperature of the combustion chamber 73, which promotes ignition retarding that retards the timing of ignition to a mixture layer. Such retarding allows a smaller portion of heat, generated with the fuel-air mixture burnt in the combustion chamber 73, to be consumed in the expansion stroke of the piston 69 and a larger portion to remain in the exhaust gas. This manner allows a larger amount of heat to be desirably allocated for the exhaust gas. This manner is therefore beneficial in quick warming-up of the engine 3 and in earlier activation of a catalyst in the exhaust gas purifier 21.

At Step ST04, the ECU15 determines whether the time needed to mix the fuel F and air is allowed based on the engine speed and the load of the engine 3. For example, when the engine 3 operates at a high engine speed, the time for one cycle is short, and less time may therefore be allowed to mix the fuel F. Furthermore, the amount of injected fuel F is increased with an increase in the load of the engine 3. The duration of injection of the fuel F is accordingly increased, and less time may therefore be allowed to mix the fuel F. If the ECU 15 determines that the time needed to mix the fuel F is allowed (Yes), the process proceeds to Step ST05. If the ECU 15 determines that the time needed to mix the fuel F is not allowed (No), the process proceeds to Step ST08.

At Steps ST05 to ST07, the ECU 15 conducts a second set of fuel injections corresponding to the fuel injection strategy illustrated in FIG. 12. The second injection control corresponds to the fuel injection control in the mid-load region (B) in FIG. 6.

At Step ST05, the ECU 15 outputs a signal to the fuel injector 37, and the fuel injector 37 performs a first fuel injection (that is, the intake-stroke injection 301) during the intake stroke. At the subsequent step ST06, the ECU 15 outputs a signal to the fuel injector 37, and the fuel injector 37 performs a second fuel injection (that is, the compression-stroke late-period injection 303) in the late period of the compression stroke. At Step ST07, the ECU 15 further outputs a signal to the fuel injector 37, and the fuel injector 37 performs a third fuel injection (that is, the compression top-dead-center injection 305) at around the compression top dead center. These three fuel injections 301, 303, and 305 at Steps ST05 to ST07 form a fuel-air mixture illustrated in FIG. 13E in the combustion chamber 73. After the compression top dead center, the zones ZI, ZR, and ZL are ignited in order by compression at different timings.

At Step ST08, the ECU 15 determines whether the risk of pre-ignition is equal to or smaller than a predetermined value based on the operating conditions of the engine 3. High temperatures of the combustion chamber 73 at the compression top dead center are likely to cause pre-ignition of the fuel-air mixture. Such a phenomenon is further noticeable as the fuel F in the mixture becomes enriched. In the combustion chamber 73 having a high temperature at the compression top dead center, the fuel-air mixture in the over-dense zone ZR is highly likely to be pre-ignited. The ECU 15 estimates the temperature of the combustion chamber 73 of the time the piston 69 reaches the compression top dead center, based on the operating conditions of the engine 3 including, for example, a value detected by the airflow sensor 129.

If the estimate temperature is lower than a predetermined temperature, the ECU 15 determines that the risk of pre-ignition is equal to or smaller than a predetermined value, in other words, determines the risk of pre-ignition not to be high. If the estimate temperature is equal to or higher than a predetermined temperature, the ECU 15 determines that the risk of pre-ignition exceeds a predetermined value, in other words, determines the risk of pre-ignition to be high. The predetermined temperature used as a reference point to evaluate the risk of pre-ignition is set at 1000 K, because the combustion chamber having a temperature equal to or greater than 1000 K increases the probability of pre-ignition. In this embodiment, the predetermined temperature is set at 1000 K as an example. If the ECU 15 determines the risk of pre-ignition not to be high (Yes) at Step ST08, the process proceeds to Step ST09. If the ECU 15 determines the risk of pre-ignition to be high (No), the process proceeds to Step ST12.

At Steps ST09 to ST11, the ECU 15 conducts a third set of fuel injections corresponding to the fuel injection strategy illustrated in FIG. 8. The third set of fuel injections corresponds to the fuel injection control in the high-load region (C) in FIG. 6.

At Step ST09, the ECU 15 outputs a signal to the fuel injector 37, and the fuel injector 37 performs a first fuel injection (that is, the intake-stroke injection 201) during the intake stroke. At the subsequent step ST10, the ECU 15 outputs a signal to the fuel injector 37, and the fuel injector 37 performs a second fuel injection (that is, the compression-stroke mid-period injection 203) in the late period of the compression stroke. At Step ST11, the ECU 15 further outputs a signal to the fuel injector 37, and the fuel injector 37 performs a third fuel injection (that is, the compression top-dead-center injection 205) at around the compression top dead center. These three fuel injections 201, 203, and 205 at Steps ST09 to ST11 form a fuel-air mixture illustrated in FIG. 9E in the combustion chamber 73. After the compression top dead center, the zones ZI, ZR, and ZL are ignited in order by compression at different timings.

At Steps ST12 to ST15, the ECU 15 conducts the above third set of fuel injections and a water injection 207 corresponding to the injection strategy of the fuel F and the water W illustrated in FIG. 10.

At Step ST12, the ECU 15 outputs a signal to the fuel injector 37, and the fuel injector 37 performs a first fuel injection (that is, the intake-stroke injection 201) during the intake stroke. At the subsequent step ST13, the ECU 15 outputs a signal to the fuel injector 37, and the fuel injector 37 performs a second fuel injection (that is, the compression-stroke mid-period injection 203) in the late period of the compression stroke. At Step ST14, the ECU 15 outputs a signal to the water injector 47, and the water injector 47 performs the above water injection 207 in the late period of the compression stroke. At Step ST15, the ECU 15 further outputs a signal to the fuel injector 37, and the fuel injector 37 performs a third fuel injection (that is, the compression top-dead-center injection 205) at around the compression top dead center. These three fuel injections 201, 203, and 205 and the water injection 207 at Steps ST12 to ST15 form a fuel-air mixture illustrated in FIG. 9E in the combustion chamber 73. After the compression top dead center, the zones ZI, ZR, and ZL are ignited in order by compression at different timings.

A temperature rise in the combustion chamber 73 in response to the operating conditions of the engine 3 is likely to cause abnormal combustion and thus to cause pre-ignition of a fuel-air mixture in the over-dense zone ZR, formed in the surrounding space of the combustion chamber 73. For such an undesired phenomenon, the engine system 1 of this embodiment is configured such that the fuel-air mixture in the over-dense zone ZR is more difficult to be ignited by compression than the fuel-air mixture in the ignition zone ZI, formed in the central space of the combustion chamber 73. This configuration can successfully make the mixture in the over-dense zone ZR ignited later than ignition of the mixture in the ignition zone ZI. This configuration therefore allows a reduction in combustion noise while maintaining stable combustion in the high-load region (C).

A preferred embodiment has been described as an example of techniques herein described. The described techniques are, however, not limited to this example but applicable to various embodiments where a change, replacement, addition, omission, and other modifications are made as appropriate. Another embodiment can be made by combining the above-described components. Some of components described in the accompanying drawings and in the description of embodiments may be unnecessary for solution to the problem. Such unnecessary components should not be immediately considered as necessary components because the components are described in the accompanying drawings and in the description of embodiments.

For example, the above embodiment may have the following configuration.

In the above embodiment, the fuel injector 37 and the water injector 47 use, but are not limited to, an outward opening injector 105. Any type of injector including, for example, an injector with a valve covered orifice (VCO) nozzle can be used for the fuel injector 37 and the water injector 47.

Such a VCO nozzle injector is capable of changing the particle size of fuel mist to be sprayed by adjusting the level of cavitation that occurs at the nozzle opening and changing the effective cross-sectional area of the spray hole. As in the outward opening injector 105, this type of injector is capable of forming a fuel-air mixture layer in the cavity 85 in the central space of the combustion chamber 73, and forming an insulating gas layer around the mixture layer, and further capable of forming mixtures having equivalence ratios different from each other in the central space and the surrounding space of the combustion chamber 73.

Figure 16:
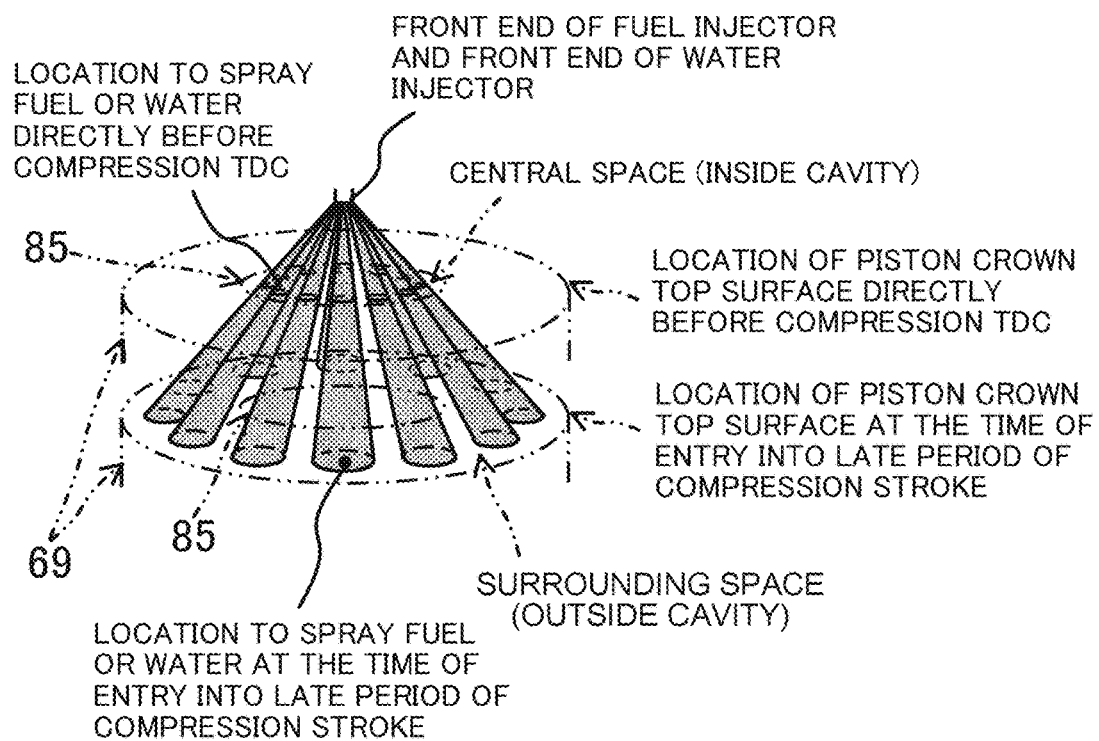
FIG. 16 illustrates an example pattern of mist sprayed from a front end of a multi-hole fuel injector or water injector.

The fuel injector 37 and the water injector 47 can be implemented by various types of injector, other than the VCO nozzle injector, such as a multi-hole injector having a plurality of spray holes. Any configuration can be adopted for the fuel injector 37 and the water injector 47. For example, as illustrated in FIG. 16, a multi-hole injector has a center axis of each spray hole inclined to the axial line of the cylinder 63. This manner allows the fuel or water sprayed from the spray holes to form a substantially hollow-cone mist pattern at a predetermined taper angle, as in the outward opening fuel injector 37 and water injector 47 described earlier. As in the outward opening fuel injector 37 and water injector 47, when such a multi-hole injector injects fuel or water, the sprayed mist of the fuel or water reaches a variety of points in the combustion chamber 73 depending on the location of the piston 69 at the timing of injection. As described in the above embodiment, this configuration makes it possible to form a fuel-air mixture layer in the cavity 85 in the central space of the combustion chamber 73 and form an insulating gas layer around the mixture layer, and further possible to form fuel-air mixtures having different equivalence ratios in the central space and the surrounding space of the combustion chamber 73 in a certain operating range.

The fuel injector 37 may include a heater to heat the fuel F and inject the fuel F, heated to a predetermined temperature by the heater, to the combustion chamber 73 having a high-pressure atmosphere so as to turn the injected fuel F into a supercritical fluid and to form a fuel-air mixture layer in the cavity 85 and an insulating gas layer around the mixture layer. The fuel F injected into the combustion chamber 73 is instantaneously vaporized, which reduces penetration of fuel mist, in other words, reduces the distance in which the mist of the fuel F travels. In this manner, this technique forms a fuel-air mixture layer near the fuel injector 37 in the cavity 85.

In the above embodiment, as an example configuration, the water feed system 13 transfers heat between water flowing in the water passage 49 and exhaust gas flowing in the exhaust gas passage 7 using the heat exchanger 55 to raise the temperature of the water, and injects the water to the combustion chamber 73 from the water injector 47. The configuration is, however, not limited thereto. As another example, the water feed system 13 may include no heat exchanger 55. The water feed system 13 may inject water flowing in the water passage 49 to the combustion chamber 73 from the water injector 47 without transferring heat between the water and exhaust gas.

In the above embodiment, if the engine 3 is cold, a water injection is performed at the same timing as that of the water injection 207 in the high-load region (C). The timing of water injection is, however, not limited thereto. The water injection may be performed at a timing different from that of the water injection 207 in the high-load region (C).

In the above embodiment, the engine system 1 causes a fuel-air mixture in the combustion chamber 73 to spontaneously ignite by means of compression of the piston 69; however, the configuration of the engine system 1 is not limited thereto. For example, the engine system 1 may have a spark plug for assisting ignition mounted on the engine 3. In this case, the engine system 1 forcibly causes ignition of a fuel-air mixture using sparks generated by electric discharge of the spark plug. The temperature of the combustion chamber 73 rises with flame propagation, whereby the fuel-air mixture is ignited by compression and burnt.

INDUSTRIAL APPLICABILITY

The techniques having been described are beneficial to a premixed compression ignition engine system mounted on a vehicle such as a car.

DESCRIPTION OF REFERENCE CHARACTERS

1 Engine System
3 Engine
5 Intake Air Passage
7 Exhaust Gas Passage
9 EGR System
11 Fuel Feed System
13 Water Feed System
15 ECU (Controller)
17 Air Cleaner
19 Throttle Valve
21 Exhaust Gas Purifier
23 Condenser
25 External EGR Device
27 Internal EGR Device
29 EGR Bypass
31 EGR Cooler
33 EGR Valve
35 Fuel Tank
37 Fuel Injector
39 Fuel Passage
41 High-Pressure Fuel Pump
43 Fuel Common Rail
45 Water Tank
47 Water Injector
49 Water Passage
51 Water Recovery System
53 High-Pressure Water Pump
55 Heat Exchanger
57 Heat Storage Case
59 Heat Storage Material
61 Outer Peripheral Wall
63 Cylinder
65 Cylinder Block
67 Cylinder Head
69 Piston 71 Connecting Rod
72 Crankshaft
73 Combustion Chamber
75 Crown Top Surface of Piston
77 Inner Peripheral Surface of Cylinder
79 Lower Surface of Cylinder Head
81 Intake-Side Ceiling Surface
83 Exhaust-Side Ceiling Surface
85 Cavity
87 Interior Surface of Cavity
89 Intake-Side Inclined Surface
91 Exhaust-Side Inclined Surface
93 Intake Port
95 Exhaust Port
97 Intake Valve
99 Exhaust Valve
101 Intake Valve Train
103 Exhaust Valve Train
105 Outward Opening Injector
107 Spray Hole
109 Nozzle Unit
111 Outward Opening Injector Body
113 Piezoelectric Device
115 Case
117 Compression Coil Spring
119 Abutment Surface
121 Crank Angle Sensor
123 Intake Camshaft Sensor
125 Exhaust Camshaft Sensor
127 Water Temperature Sensor
129 Airflow Sensor
131 Throttle Position Sensor
133, 135 Oxygen Sensor
137 EGR Valve Position Sensor
139 Speed Sensor
141 Accelerator Pedal Position Sensor

The invention claimed is:

1. A premixed compression ignition engine system, comprising:
an engine having a cylinder;
a piston reciprocatably disposed in the cylinder;
a fuel injector configured to inject fuel and a water injector configured to inject water, into a combustion chamber defined by a crown top surface of the piston, the cylinder, and a lower surface of a cylinder head; and
a controller configured to control fuel injection operation of the fuel injector and water injection operation of the water injector;
the premixed compression ignition engine system having a downward concave cavity formed in a central portion of the crown top surface of the piston,
the premixed compression ignition engine system forming a fuel-air mixture including air and fuel injected into the combustion chamber by the fuel injector, and igniting the fuel-air mixture by a compression operation of the piston, in the combustion chamber, at least in a central space corresponding to an inside of the cavity, of the central space and a surrounding space corresponding to an outer periphery of the cavity, wherein
the controller conducts: a first fuel injection that causes the fuel injector to inject fuel to form a fuel-air mixture in the surrounding space of the combustion chamber; a second fuel injection that causes the fuel injector to inject fuel to form a fuel-air mixture in the central space of the combustion chamber after the first fuel injection; and a water injection that causes the water injector to inject water to the surrounding space of the combustion chamber at a timing from commencement of the first fuel injection to commencement of the second fuel injection.

2. The premixed compression ignition engine system of claim 1, wherein
the controller conducts neither first fuel injection nor water injection when the engine is operating in a first operating range that is lower than a predetermined load, and conducts the first fuel injection and the water injection when the engine is operating in a second operating range that is higher than the predetermined load.

3. The premixed compression ignition engine system of claim 1, wherein
the controller estimates a temperature of the combustion chamber of a time when the piston reaches a compression top dead center, conducts the water injection when the estimated temperature is equal to or higher than a predetermined temperature, and conducts no water injection when the estimate temperature is lower than the predetermined temperature.

4. The premixed compression ignition engine system of claim 3, wherein
the predetermined temperature is set at 1000 K or more.

5. The premixed compression ignition engine system of claim 1, wherein
the controller conducts the water injection when the engine is cold.

6. The premixed compression ignition engine system of claim 1, wherein
a geometrical compression ratio of the engine is set from 16 to 35.

7. The premixed compression ignition engine system of claim 1, wherein
the fuel injector and the water injector have respective front ends with spray holes disposed in a center portion of a ceiling of the combustion chamber,
the spray hole of the fuel injector and the spray hole of the water injector are inclined to an axial line of the cylinder so that mist of fuel sprayed from the front end of the fuel injector and mist of water sprayed from the front end of the water injector toward the crown top surface of the piston form a hollow-cone pattern, and
the controller causes the water injector to inject water in a late period of a compression stroke equally divided into early, mid-, and late periods, causes the fuel injector to perform the first fuel injection in the mid-period of the compression stroke, and causes the fuel injector to perform the second fuel injection from the late period of the compression stroke after the water injection.

* * * * *